(12) United States Patent
Yamamoto et al.

(10) Patent No.: US 11,146,737 B2
(45) Date of Patent: *Oct. 12, 2021

(54) VIDEO DISPLAY SYSTEM AND VIDEO DISPLAY METHOD

(71) Applicant: PANASONIC INTELLECTUAL PROPERTY MANAGEMENT CO., LTD., Osaka (JP)

(72) Inventors: Masaya Yamamoto, Kyoto (JP); Masayuki Kozuka, Osaka (JP); Yoshiichiro Kashiwagi, Kyoto (JP); Toshiroh Nishio, Osaka (JP); Kazuhiko Kouno, Osaka (JP); Hiroshi Yahata, Osaka (JP); Takeshi Hirota, Osaka (JP); Yoshihiro Mori, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 166 days.

This patent is subject to a terminal disclaimer.

(21) Appl. No.: 16/333,894

(22) PCT Filed: Feb. 26, 2018

(86) PCT No.: PCT/JP2018/006862
§ 371 (c)(1),
(2) Date: Mar. 15, 2019

(87) PCT Pub. No.: WO2019/069482
PCT Pub. Date: Apr. 11, 2019

(65) Prior Publication Data
US 2021/0006689 A1 Jan. 7, 2021

Related U.S. Application Data

(60) Provisional application No. 62/569,301, filed on Oct. 6, 2017.

(51) Int. Cl.
*H04N 5/235* (2006.01)
*H04N 5/20* (2006.01)
(Continued)

(52) U.S. Cl.
CPC ............. *H04N 5/2355* (2013.01); *H04N 5/20* (2013.01); *H04N 5/2354* (2013.01); *H04N 21/431* (2013.01); *H04N 21/435* (2013.01)

(58) Field of Classification Search
CPC ....... H04N 5/20; H04N 21/435; H04N 21/431
(Continued)

(56) References Cited

U.S. PATENT DOCUMENTS

2013/0038790 A1   2/2013   Seetzen et al.
2014/0210847 A1   7/2014   Knibbeler et al.
(Continued)

FOREIGN PATENT DOCUMENTS

JP    2016-100039 A    5/2016
JP    6104411 B2       3/2017
(Continued)

OTHER PUBLICATIONS

International Search Report and Written Opinion issued in International Patent Application No. PCT/JP2018/006861, dated May 15, 2018; with partial English translation.
(Continued)

*Primary Examiner* — Michael Lee
(74) *Attorney, Agent, or Firm* — McDermott Will and Emery LLP

(57) ABSTRACT

A video display system includes: a tone mapping processor; a display; and a metadata processor that generates first dynamic metadata that indicates a maximum luminance that is constant over a plurality of time intervals by using static metadata. The video display system switches between: a first operation of (i) generating the first dynamic metadata by
(Continued)

using the static metadata, performed by the metadata processor and (ii) performing the tone mapping process by using the first dynamic metadata, performed by the tone mapping processor; and a second operation of performing the tone mapping process by using second dynamic metadata in which the maximum luminance varies over the plurality of time intervals, performed by the tone mapping processor.

8 Claims, 15 Drawing Sheets

(51) Int. Cl.
   *H04N 21/431* (2011.01)
   *H04N 21/435* (2011.01)
(58) Field of Classification Search
   USPC .......................................................... 348/564
   See application file for complete search history.

(56) References Cited

U.S. PATENT DOCUMENTS

| | | |
|---|---|---|
| 2015/0256860 A1 | 9/2015 | Kunkel et al. |
| 2016/0005201 A1 | 1/2016 | Kunkel et al. |
| 2016/0080716 A1 | 3/2016 | Atkins et al. |
| 2016/0100147 A1 | 4/2016 | Kim et al. |
| 2016/0212399 A1* | 7/2016 | Uchimura ............ G11B 27/329 |
| 2016/0330513 A1 | 11/2016 | Toma et al. |
| 2017/0186141 A1 | 6/2017 | Ha et al. |
| 2017/0243612 A1 | 8/2017 | Yahata et al. |
| 2017/0251161 A1 | 8/2017 | Toma et al. |
| 2017/0330312 A1 | 11/2017 | Nam |
| 2018/0018932 A1 | 1/2018 | Atkins |
| 2018/0278985 A1 | 9/2018 | De Haan et al. |
| 2018/0376194 A1* | 12/2018 | Oh ...................... H04N 21/4334 |
| 2019/0020852 A1* | 1/2019 | Bak ........................ H04N 7/035 |
| 2019/0043233 A1 | 2/2019 | Kim et al. |
| 2019/0251680 A1 | 8/2019 | Kozuka et al. |
| 2019/0335149 A1* | 10/2019 | Hirota .................. H04N 21/431 |
| 2019/0394384 A1* | 12/2019 | Yamamoto ............... H04N 5/20 |
| 2020/0236334 A1* | 7/2020 | Hirota ....................... H04N 9/73 |
| 2020/0258543 A1* | 8/2020 | Yahata ................. G11B 27/329 |

FOREIGN PATENT DOCUMENTS

| | | |
|---|---|---|
| WO | 2014/130213 A1 | 8/2014 |
| WO | 2016/027423 A1 | 2/2016 |
| WO | 2016/074999 A1 | 5/2016 |

OTHER PUBLICATIONS

Non-Final Office Action issued in U.S. Appl. No. 16/331,464, dated Mar. 20, 2020.
Non-Final Office Action issued in U.S. Appl. No. 16/331,456, dated Feb. 19, 2020.
Notice of Allowance issued in U.S. Appl. No. 16/332,738, dated Jul. 1, 2020.
Non-Final Office Action issued in U.S. Appl. No. 16/333,885, dated May 14, 2020.
Extended European Search Report issued in European Patent Application No. 18820540.5, dated Apr. 30, 2020.
Extended European Search Report issued in European Patent Application No. 18820085.1, dated May 4, 2020.
Extended European Search Report issued in European Patent Application No. 18831862.0, dated Apr. 24, 2020.
Extended European Search Report issued in European Patent Application No. 18831863.8, dated Apr. 29, 2020.
International Search Report and Written Opinion dated May 15, 2018 in International Patent Application No. PCT/JP2018/006856; with partial English translation.
International Search Report and Written Opinion dated May 15, 2018 in International Patent Application No. PCT/JP2018/006857; with partial English translation.
International Search Report and Written Opinion issued in International Patent Application No. PCT/JP2018/006860 dated May 15, 2018; with partial English translation.
International Search Report and Written Opinion issued in International Patent Application No. PCT/JP2018/006863, dated May 15, 2018.
Non-Final Office Action issued in U.S. Appl. No. 16/332,751, dated Oct. 16, 2020.
Extended European Search Report issued in EP patent application No. 18852740.2, dated Nov. 2, 2020.
Extended European Search Report issued in EP patent application No. 18852787.3, dated Nov. 2, 2020.
White Paper Blu-ray Disc Read-Only Format (Ultra HD Blu-ray), Audio Visual Application Format Specifications for BD-ROM Version 3.1, Aug. 2016, http://www.blu-raydisc.com/Assets/Downloadablefile/BD-ROM_Part3_V3.1_WhitePaper_160729_clean.pdf.
International Search Report and Written Opinion issued in International Patent Application No. PCT/JP2018/006862, dated May 15, 2018.
Internmational Search Report and Written Opinion issued in International Patent Application No. PCT/JP2018/006863, dated May 15, 2018.

* cited by examiner

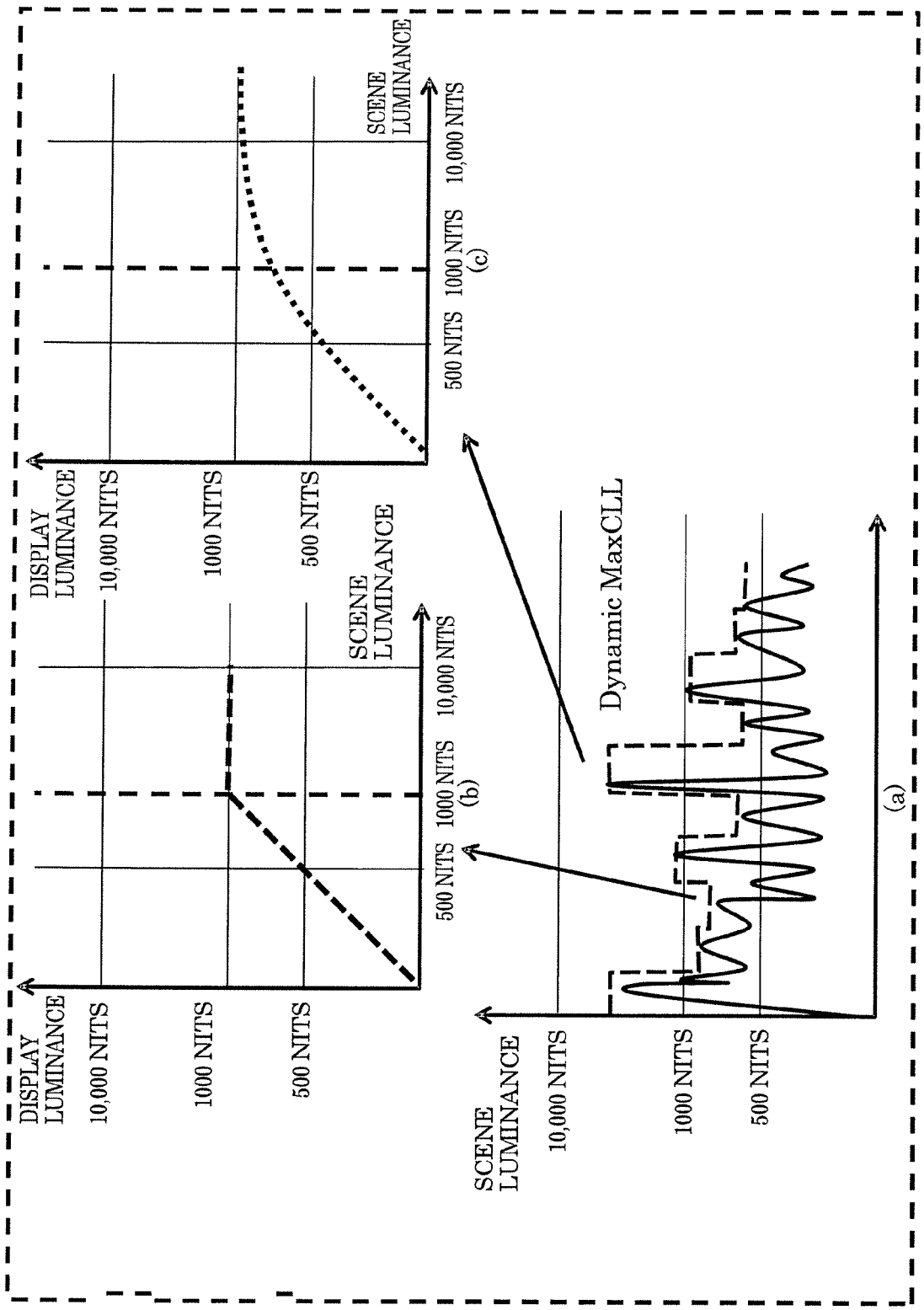

FIG. 10

| Mode | JAVA/HDMV IG API | | | EDID | VSIF | | | | OPERATIONS OF VIDEO DISPLAY APPARATUS |
|---|---|---|---|---|---|---|---|---|---|
| | GMOF | TVPAF | MaxLLGM | MAXTVLL | GMOF | MaxLLGM | DMBM | VALUE OF DYNAMIC METADATA | |
| Mode 1 | OFF | NA | NA | NA | OFF | NA | OFF | DYNAMIC VALUE | FORCE DYNAMIC TONE MAPPING |
| Mode 2 | ON | ON | NA | NA | ON | NA | OFF | DYNAMIC VALUE | SELECT DYNAMIC OR STATIC TONE MAPPING |
| Mode 3 | ON | ON | NA | NA | ON | GENERATE | OFF | DYNAMIC VALUE | SELECT DYNAMIC OR STATIC TONE MAPPING |
| Mode 4 | ON | ON | AVAILABLE | NA | ON | NO CALCULATION | OFF | DYNAMIC VALUE | SELECT DYNAMIC OR STATIC TONE MAPPING |
| Mode 5 | ON | OFF | NA | NA | ON | NA | ON | FIXED STATIC VALUE | FORCE STATIC TONE MAPPING |
| Mode 6 | ON | OFF | AVAILABLE | High | ON | NA | ON | DYNAMIC VALUE | FORCE DYNAMIC TONE MAPPING |
| Mode 7 | ON | OFF | AVAILABLE | Low | ON | NA | ON | FIXED STATIC VALUE | FORCE STATIC TONE MAPPING |

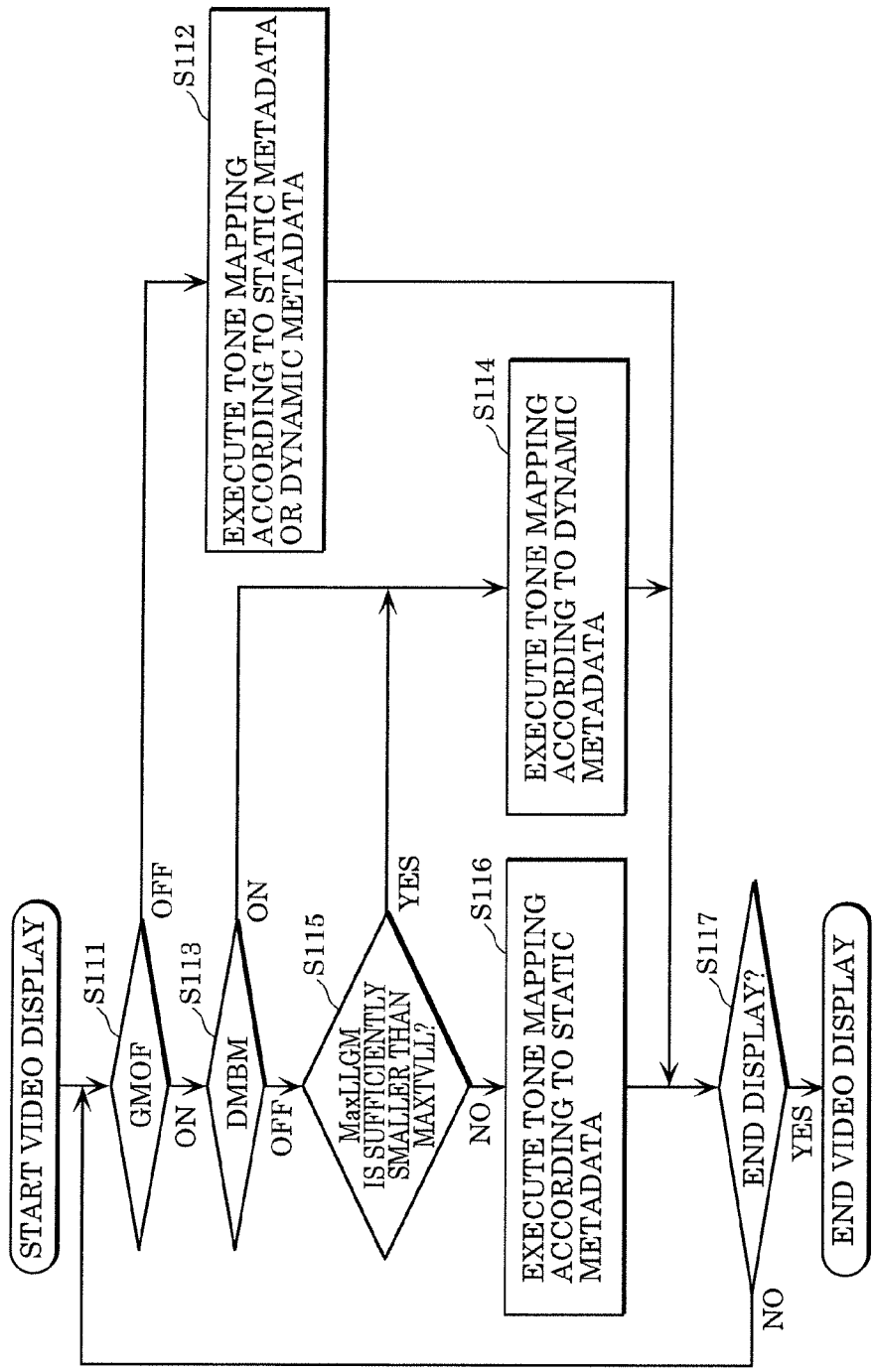

VIDEO DISPLAY SYSTEM AND VIDEO DISPLAY METHOD

CROSS-REFERENCE OF RELATED APPLICATIONS

This application is the U.S. National Phase under 35 U.S.C. § 371 of International Patent Application No. PCT/JP2018/006862, filed on Feb. 26, 2018, which in turn claims the benefit of U.S. Provisional Application No. 62/569,301, filed on Oct. 6, 2017, the entire disclosures of which Applications are incorporated by reference herein.

TECHNICAL FIELD

The present disclosure relates to a video display system and a video display method for displaying a video.

BACKGROUND ART

Patent Literature (PTL) 1 discloses a method and a system for mapping graphics on an image of an HDR (High Dynamic Range) video.

CITATION LIST

Patent Literature

PTL 1: Japanese Patent No. 6104411

Non-Patent Literature

NPL 1: White Paper Blu-ray Disc Read-Only Format (Ultra HD Blu-ray), Audio Visual Application Format Specifications for BD-ROM Version 3.1, August 2016, http://www.blu-raydisc.com/Assets/Downloadablefile/BD-ROM_Part3_V3.1_WhitePa per_160729_clean.pdf

SUMMARY OF THE INVENTION

Technical Problem

The present disclosure provides a video display system and a video display method that can improve the quality of a video displayed.

Solution to Problem

A video display system according to an aspect of the present disclosure includes: a tone mapping processor that performs a tone mapping process of, by using dynamic metadata indicating a maximum luminance of a video in each of a plurality of time intervals included in a predetermined period, converting a luminance of the video in each time interval based on conversion characteristics according to the maximum luminance of the video in the time interval; a display that displays the video that has undergone the tone mapping process; and a metadata processor that generates first dynamic metadata that indicates the maximum luminance that is constant over the plurality of time intervals by using static metadata that indicates a maximum luminance of the video in the predetermined period. The video display system switches between: a first operation of (i) generating the first dynamic metadata by using the static metadata, performed by the metadata processor, and (ii) performing the tone mapping process by using the first dynamic metadata, performed by the tone mapping processor; and a second operation of the tone mapping processor performing the tone mapping process by using second dynamic metadata in which the maximum luminance varies over the plurality of time intervals.

Advantageous Effect of Invention

The present disclosure can provide a video display system and a video display method that can improve the quality of a video displayed.

BRIEF DESCRIPTION OF DRAWINGS

FIG. 4B is a diagram showing an example of dynamic tone mapping.

FIG. 10 is a diagram showing the relationship between various types of flags and the operations of a video display apparatus according to the embodiment.

FIG. 14 is a flowchart illustrating the operations of the video display apparatus according to the embodiment.

DESCRIPTION OF EXEMPLARY EMBODIMENTS

[1-1. Background]

Figure 1:
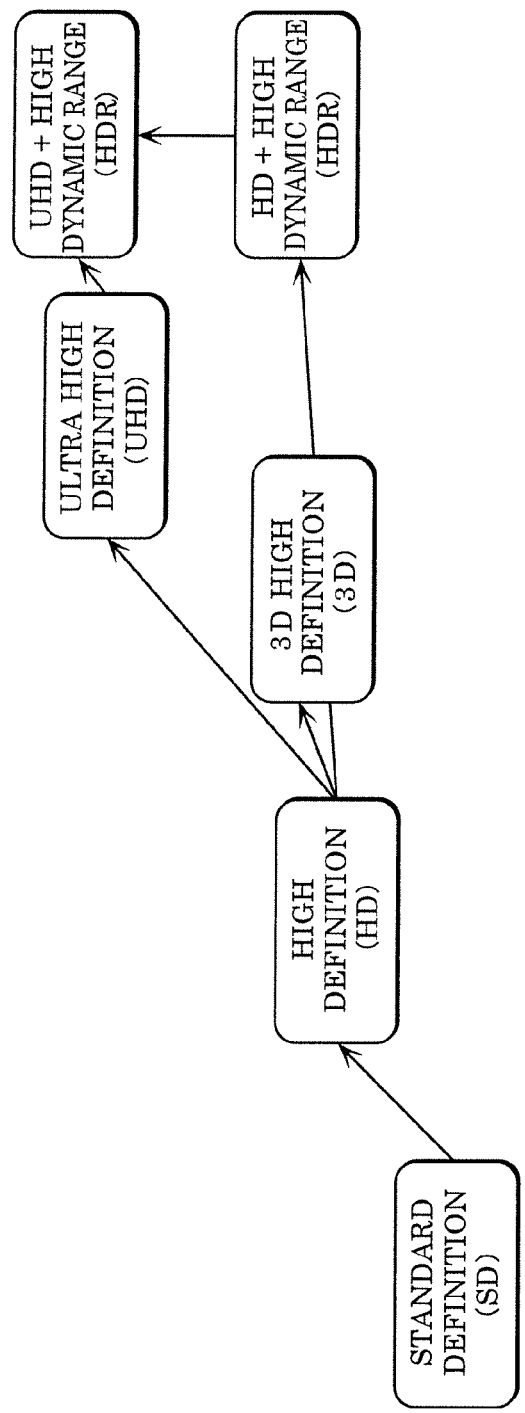
FIG. 1 is a diagram illustrating the evolution of imaging technology.

First, the transition of imaging technology will be described with reference to FIG. 1. FIG. 1 is a diagram illustrating the evolution of imaging technology.

In order to enhance video image quality, conventionally, the focus has been given to increase the number of pixels displayed. Accordingly, standard definition (SD) videos (720×480 pixels) and high definition (HD) videos (1920×1080 pixels) are now widely used.

In recent years, in order to achieve even higher image quality, introduction of ultra-high definition (UHD) videos (3840×1920 pixels), or so-called 4K resolution videos (with a 4K resolution of 4096×2048 pixels) has started.

Along with the introduction of 4K resolution videos, consideration is also given to expanding the dynamic range, expanding the color gamut, adding or improving the frame rate, and the like.

Among these, with respect to the dynamic range, HDR (High Dynamic Range) rendering is receiving increased attention as a method for representing bright light, such as specular reflection light, that cannot be represented by a currently used television signal to be more close to reality while maintaining low light signal gradation. Specifically, conventional television signals are called SDR (Standard Dynamic Range) signals, and the highest luminance is 100 nits. In contrast, in HDR signals, the highest luminance is expected to be up to 1000 nits or more. For HDR signals, standardization of mastering display standards is currently undertaken by SMPTE (Society of Motion Picture & Television Engineers), ITU-R (International Telecommunications Union Radio communications Sector), and the like.

Specific applications of HDR include, as with HD and UHD, broadcasting, packaged media (Blu-ray® disc, and the like), internet delivery, and the like.

[1-2. Relationship between Generation of Master, Delivery Methods, and Display Apparatuses]

Figure 2:
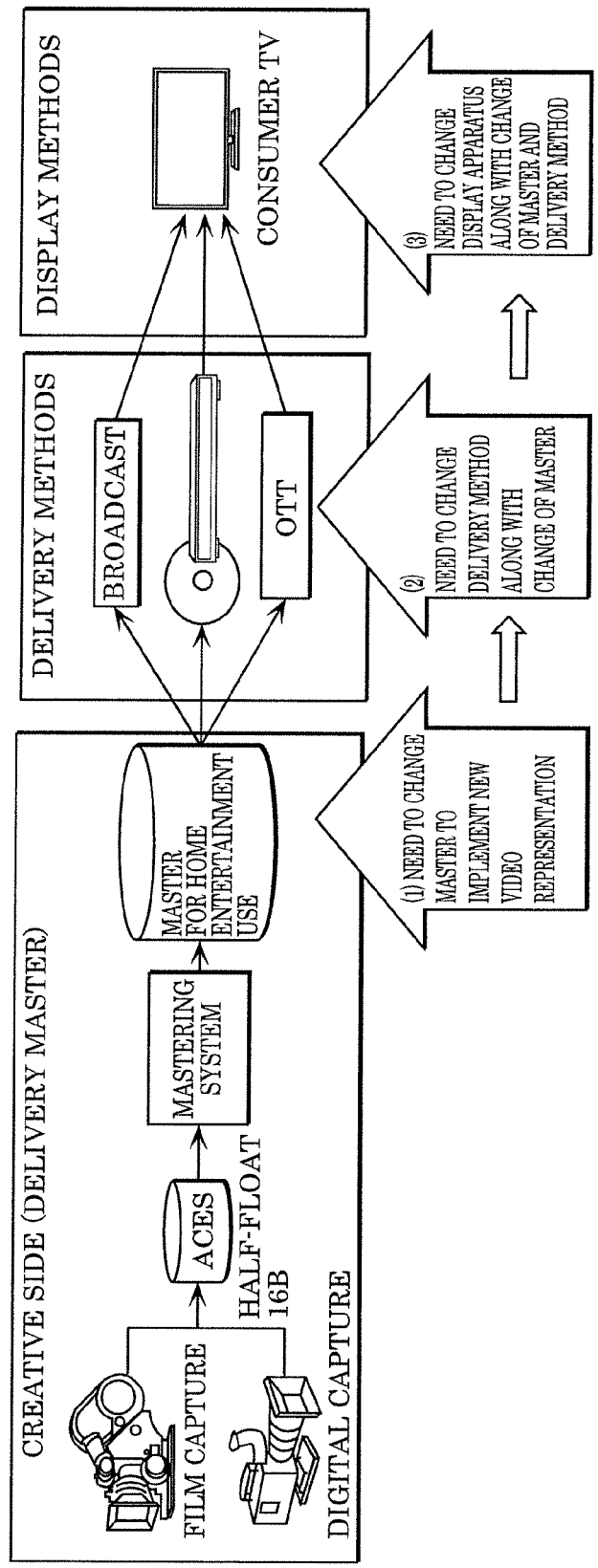
FIG. 2 is a diagram illustrating the relationship between video production, delivery methods, and display apparatuses when a new video representation is introduced into content.

FIG. 2 is a diagram illustrating the relationship between video production, delivery methods, and display apparatuses when a new video representation is introduced into content.

In the case where a new video representation is introduced (for example, the number of pixels is increased) so as to enhance video image quality, as shown in FIG. 2, it is necessary to (1) change a master for home entertainment on the video production side. Along with this change, it is also necessary to (2) update the delivery method such as broadcasting, communication, or a packaged medium, and also (3) update the display apparatus such as a television set or a projector for displaying the video.

[1-3. Tone Mapping]

Tone mapping is processing for adjusting, based on the relationship between the luminance of an HDR video and the maximum luminance (Display Peak Luminance: DPL) of a video display apparatus, the luminance of the video to be less than or equal to DPL by converting the luminance of the video if the maximum luminance (Maximum Content Luminance Level: MaxCLL) of the video exceeds DPL. Through this processing, the video can be displayed without losing information near the maximum luminance of the video. The conversion depends on the characteristics of the video display apparatus, and also depends on how to display the video, and thus different conversion characteristics are used for each video display apparatus.

Figure 3A:
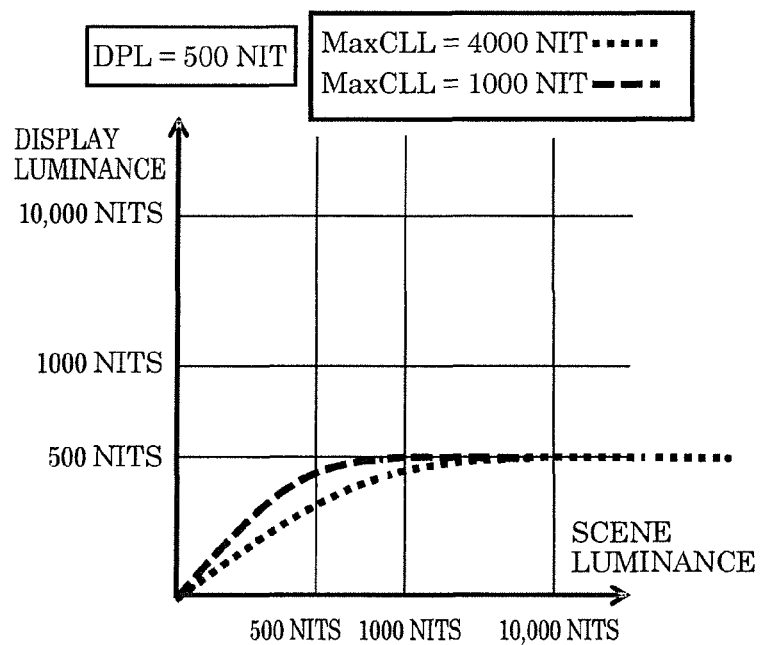
FIG. 3A is a diagram showing an example of tone mapping.
Figure 3B:
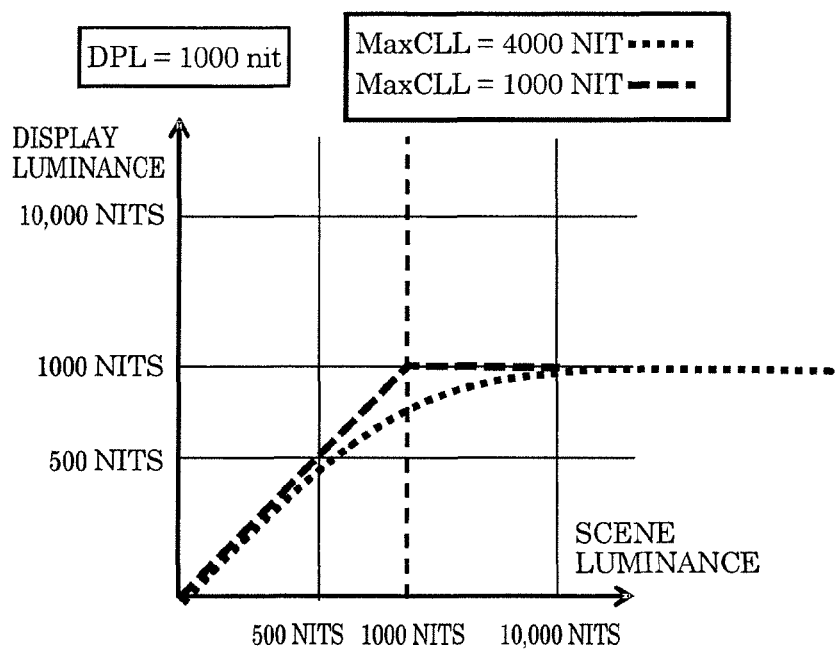
FIG. 3B is a diagram showing an example of tone mapping.

FIGS. 3A and 3B are diagrams showing examples of tone mapping. FIG. 3A shows a case where DPL is 500 nits, and FIG. 3B shows a case where DPL is 1000 nits. Also, FIGS. 3A and 3B each show an example of tone mapping performed when a video having a MaxCLL of 1000 nits is displayed and an example of tone mapping performed when a video having a MaxCLL of 4000 nits is displayed.

As shown in FIG. 3A, in the case where DPL is 500 nits, in both videos, the luminance is converted such that the video can be displayed at up to MaxCLL below 500 nits, but the degree of conversion is higher in the video having a higher MaxCLL.

As shown in FIG. 3B, in the case where DPL is 1000 nits, in the video having a MaxCLL of 1000 nits, tone mapping is not performed. In the video having a MaxCLL of 4000 nits, tone mapping is performed so as to convert the luminance from 4000 nits to 1000 nits, and the video is displayed at that luminance.

[1-4. Dynamic Metadata and Dynamic Tone Mapping]

Figure 4A:
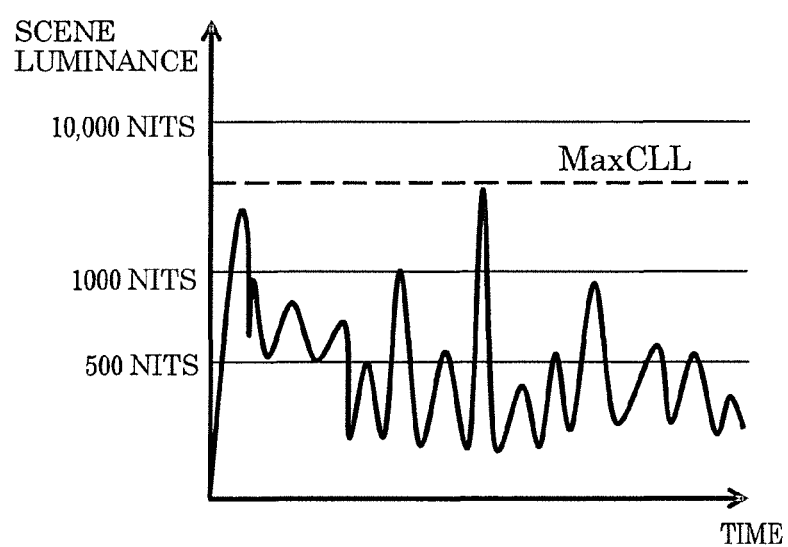
FIG. 4A is a diagram showing an example of static tone mapping.

FIG. 4A is a diagram showing an example of tone mapping using static metadata. FIG. 4B is a diagram showing an example of dynamic tone mapping using dynamic metadata.

As shown in FIG. 4A, in the case where static metadata (MaxCLL) is used, MaxCLL indicates the highest luminance in a video sequence, and thus the video display apparatus can perform only fixed tone mapping on the video sequence. In contrast, as shown in (a) in FIG. 4B, in the case where metadata suitable according to the luminance that varies with time (here, referred to as Dynamic MaxCLL) is used, the video display apparatus does not perform tone mapping when the luminance is low ((b) in FIG. 4B), and performs tone mapping when the luminance is high ((c) in FIG. 4B). In this way, optimal tone mapping suitable for the luminance that varies with time can be implemented.

[1-5. Overlaying Graphics on Video]

Figure 5:
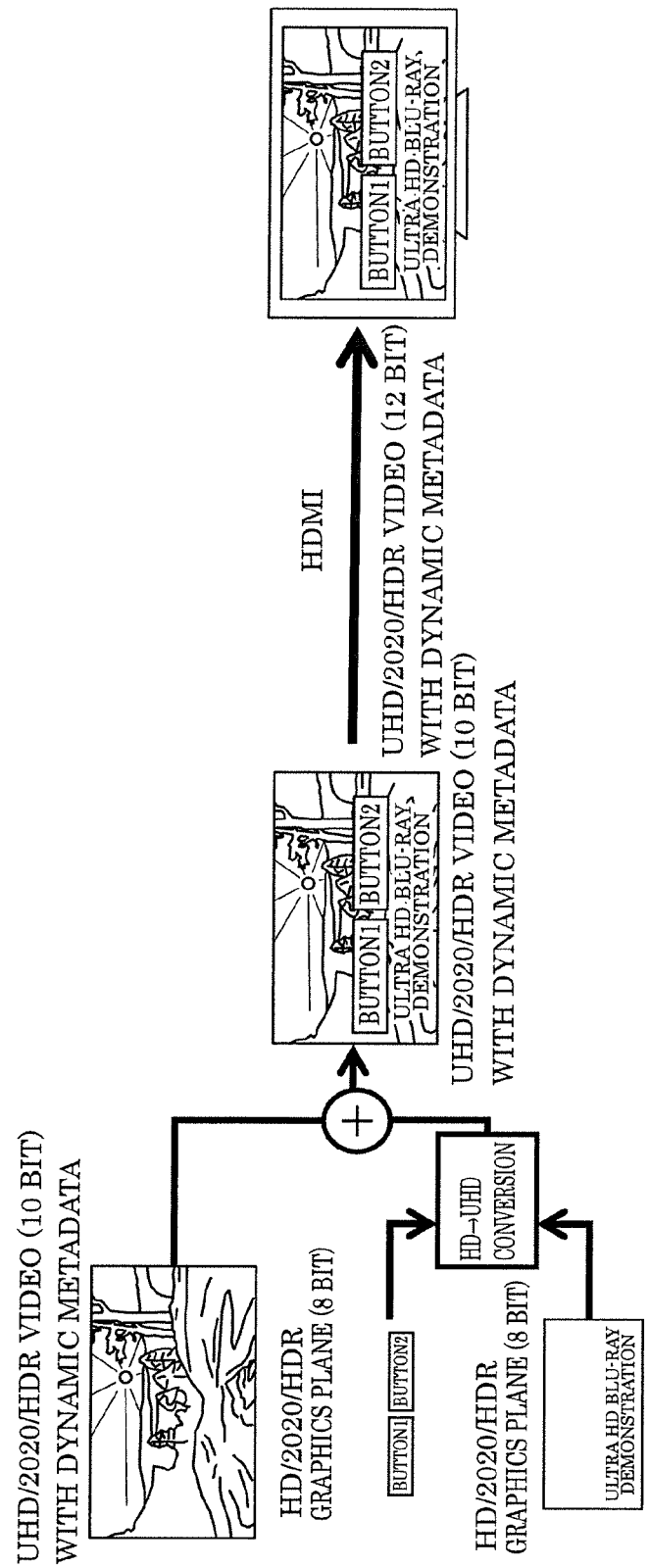
FIG. 5 is a diagram showing an example in which graphics are overlaid on a moving image, and the resulting moving image is displayed.

FIG. 5 is a diagram showing an example in which graphics such as a menu and subtitles are overlaid on a moving image, and the moving image is displayed on a video display apparatus. Here, an example of Ultra HD Blu-ray is shown.

A set of moving images before graphics are overlaid will be referred to as a main video. With Ultra HD Blu-ray, graphics are prepared in HD resolution. A video reproduction apparatus performs HD-UHD conversion on the graphics in HD resolution so as to generate graphics in UHD resolution. Then, the video reproduction apparatus overlays the obtained graphics in UHD resolution with the main video having UHD resolution. Then, the video reproduction apparatus transmits the video resulting from the overlay process to a video display apparatus via HDMI® (High-Definition Multimedia Interface). The video display apparatus displays the transmitted video in HDR.

Also, the video reproduction apparatus determines dynamic metadata based on the variation of the luminance of the main video with time, and transmits the dynamic metadata to the video display apparatus via HDMI. The video display apparatus performs dynamic tone mapping on a video signal of the video obtained by overlaying subtitles and menus on the main video based on the transmitted dynamic metadata.

The same applies to an HDR video that is displayed through an OTT (over the top) service via broadcasting or communication and in which a menu or subtitles are overlaid on a main video, and the resulting video is displayed on a video display apparatus.

[1-6. Conventional Video Reproduction Apparatus]

A configuration of a conventional HDR-compatible video reproduction apparatus will be described. First, a video reproduction apparatus that supports only static metadata (HDR10, in the case of Mandatory HDR specified by BDA) will be described.

Figure 6:
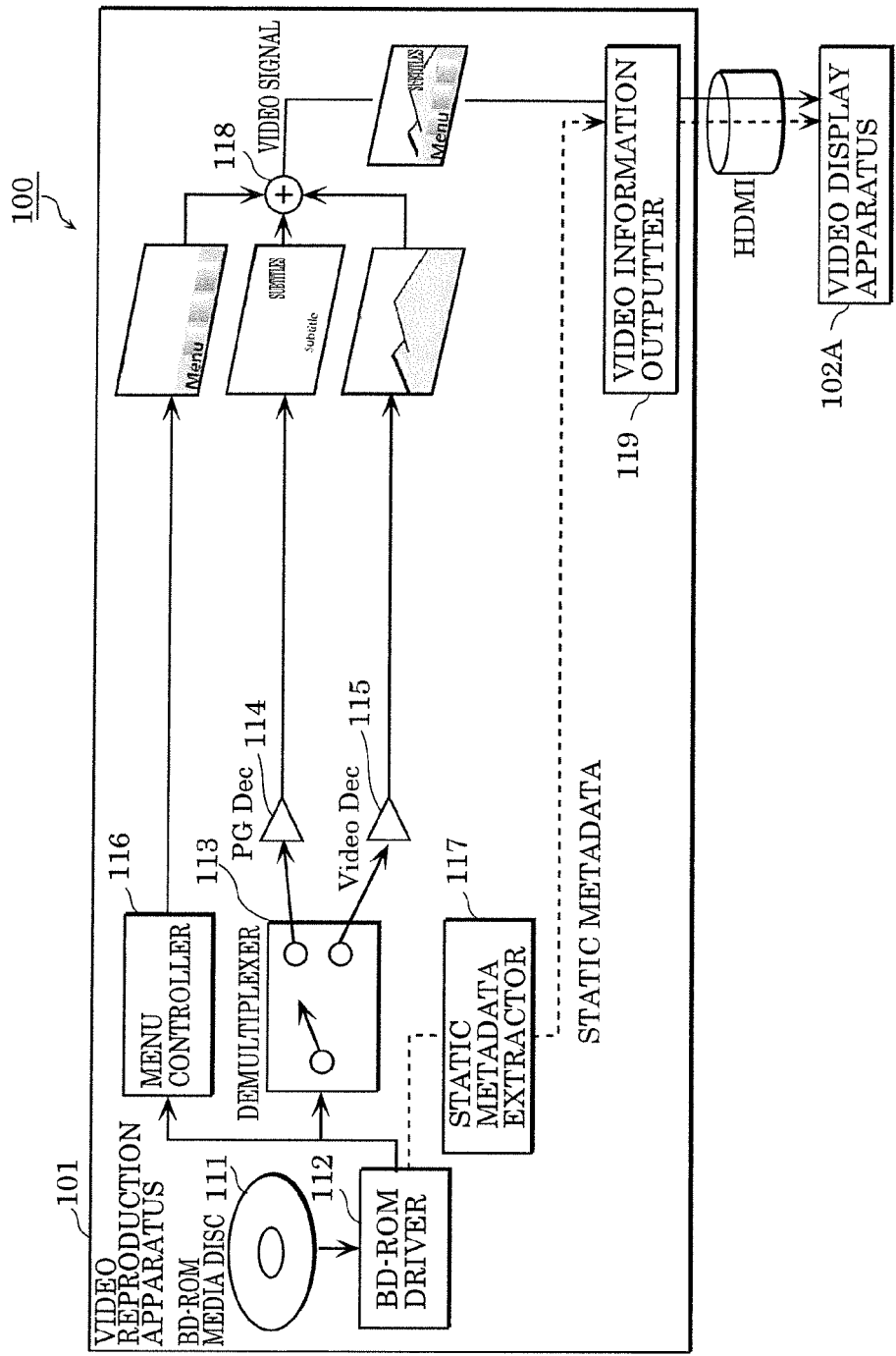
FIG. 6 is a diagram showing a configuration of a conventional video display system.

FIG. 6 is a diagram showing a configuration of conventional video display system 100. Video display system 100 includes video reproduction apparatus 101 and video display apparatus 102. Video reproduction apparatus 101 is an HDR-compatible video reproduction apparatus, and includes disc 111, BD-ROM driver 112, demultiplexer 113, PG decoder (PG Dec) 114, video decoder (Video Dec) 115, menu controller 116, static metadata extractor 117, video composer 118, and video information outputter 119.

Disc 111 is a recording medium such as, for example, a BD-ROM media disc in which a video and other necessary information are recorded. BD-ROM driver 112 reads information from disc 111. Demultiplexer 113 extracts subtitles information, video information, and audio information (not shown) from the information output from BD-ROM driver 112.

PG decoder 114 generates subtitle graphics from the subtitles information extracted by demultiplexer 113. Video decoder 115 generates a video signal from the video information extracted by demultiplexer 113.

Menu controller 116 performs generation of menu graphics and control thereof by using the information output from BD-ROM driver 112. Static metadata extractor 117 extracts static metadata from the information output from BD-ROM driver 112.

Video composer 118 generates a video signal by overlaying the menu graphics generated by menu controller 116, the subtitle graphics generated by PG decoder 114, and the video information generated by video decoder 115. Video information outputter 119 transmits the video signal generated by video composer 118, the audio signal (not shown) extracted by demultiplexer 113, and the static metadata extracted by static metadata extractor 117 to video display apparatus 102 via a transmitter such as HDMI.

Figure 7:
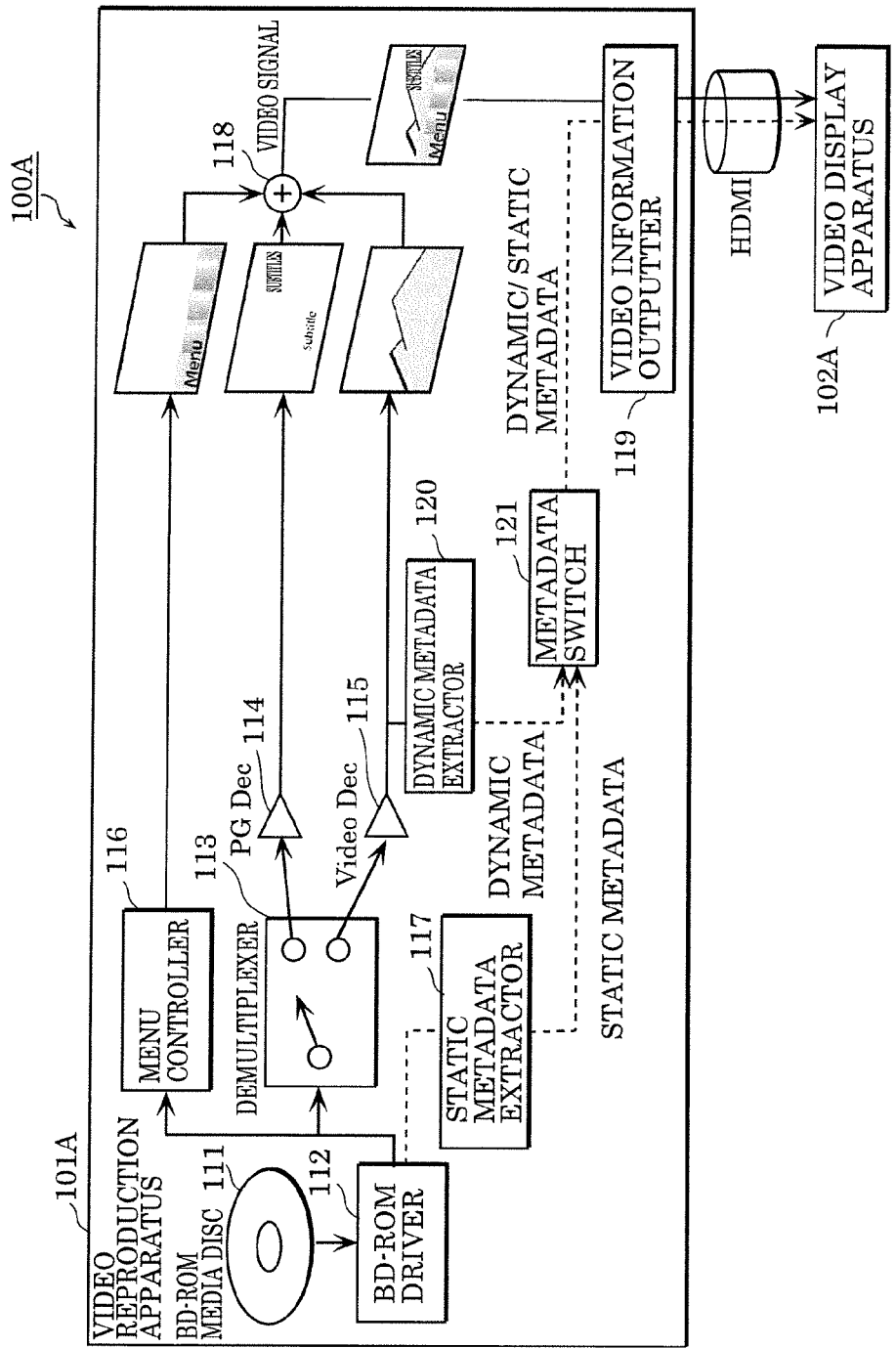
FIG. 7 is a diagram showing a configuration of a conventional video display system.

Next, a configuration of an HDR-compatible video reproduction apparatus having dynamic metadata will be described. FIG. 7 is a diagram showing a configuration of video display system 100A that includes HDR-compatible video reproduction apparatus 101A having dynamic metadata. Video display system 100 includes video reproduction apparatus 101A and video display apparatus 102A.

Video reproduction apparatus 101A includes, in addition to the structural elements of video reproduction apparatus 101 shown in FIG. 6, dynamic metadata extractor 120 and metadata switch 121.

Dynamic metadata extractor 120 extracts dynamic metadata included in the video information generated by video decoder 115. Metadata switch 121 performs processing such as switching the metadata to be output between the dynamic metadata extracted by dynamic metadata extractor 120 and the static metadata extracted by static metadata extractor 117, or outputting both metadata. Video information outputter 119 transmits the metadata output from metadata switch 121 together with the video signal to video display apparatus 102A via a transmitter such as HDMI.

Here, an example has been described in which the dynamic metadata is included in the video information, but the dynamic metadata may be recorded in disc 111 separately, and transmitted to metadata switch 121 in synchronization with the video information. With this configuration, dynamic tone mapping based on the dynamic metadata can be implemented by video display apparatus 102.

The details of Blu-ray and Ultra HD Blu-ray are disclosed in, for example, Non-Patent Literature (NPL) 1.

[1-7. Problem Arising when Performing Dynamic Tone Mapping on Video Data where Graphics are Overlaid on Moving Image]

In the dynamic metadata method, metadata regarding the luminance of the HDR video such as luminance distribution is designated for each frame, and the metadata is transmitted to the video display apparatus together with the video signal. The video display apparatus performs processing such as luminance conversion based on the transmitted metadata according to the display capabilities of the video display apparatus such as maximum luminance. The dynamic metadata method as described above is receiving increased attention as a method for displaying a video at a constant quality as much as possible irrespective of the display performance of a video display apparatus such as luminance.

However, dynamic metadata varies with time, and thus there is a problem in that a video that needs to be displayed stably is not displayed stably.

If the video to be displayed is a video or a set of so-called moving images that is simultaneously edited or supervised, processing can be performed considering the state of the video to some degree. When graphics data such as subtitles or a menu whose luminance is essentially constant and does not vary at all is overlaid on a main video composed of a set of moving images as described above and displayed, due to the processing that uses dynamic metadata, a negative effect occurs such as variation of the luminance or color of the graphics that essentially needs to be constant. This negative effect becomes more prominent as the luminance of the main video is higher and the luminance of the video display apparatus is lower.

Figure 8:
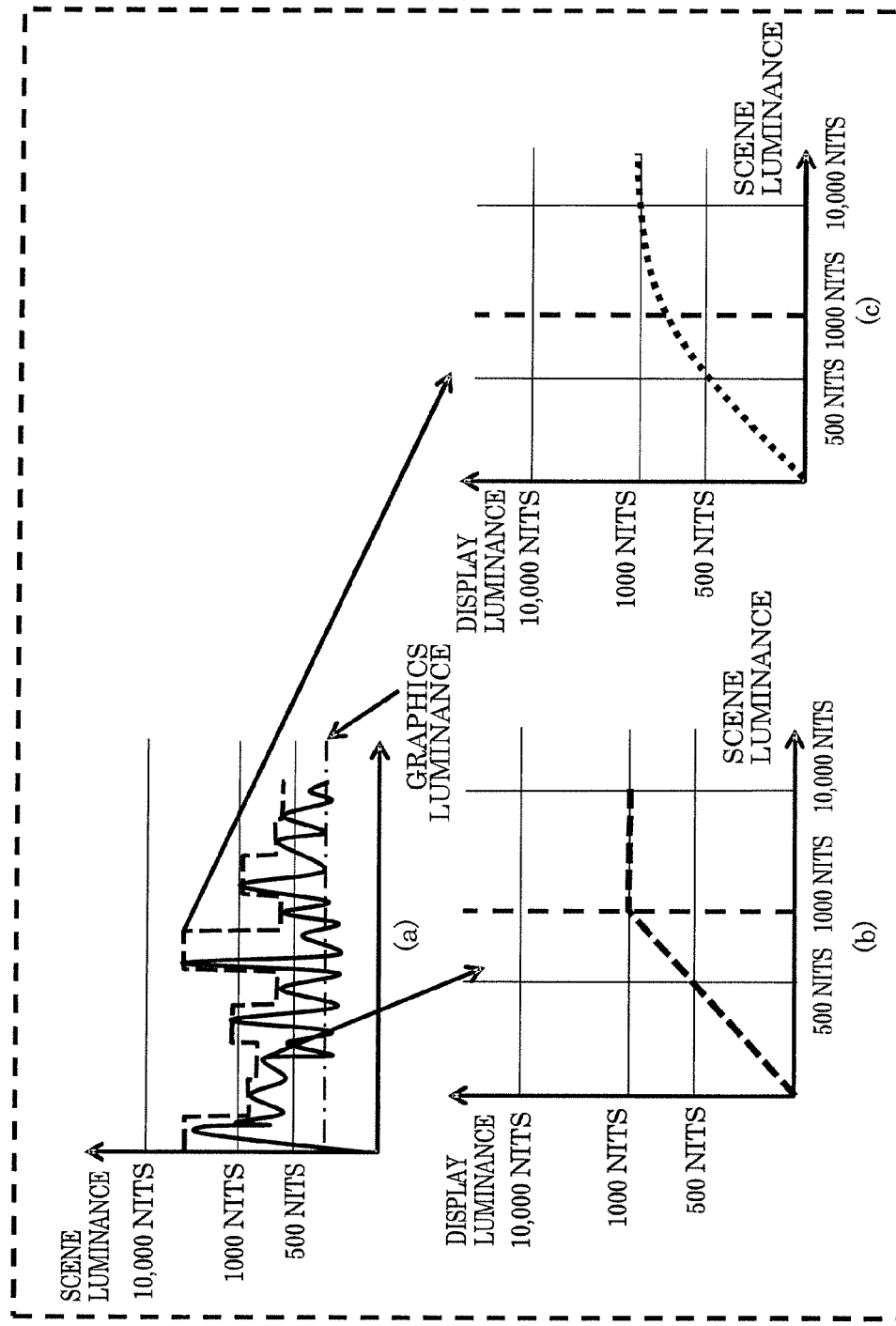
FIG. 8 is a diagram showing the influence of dynamic tone mapping when graphics are overlaid on a main video.

FIG. 8 is a diagram showing the influence of dynamic tone mapping when graphics are overlaid on a main video. It is assumed here that, as shown in (a) in FIG. 8, graphics to be overlaid has a luminance of 350 nits. As shown in (b) in FIG. 8, in a section in which the luminance of the main video is low, tone mapping is not performed, and thus the graphics are displayed on a video display apparatus at a luminance of 350 nits that is the original luminance of the graphics. On the other hand, as shown in (c) in FIG. 8, in a section in which the luminance of the main video is high, tone mapping is performed, and thus the graphics are displayed on the video display apparatus at a luminance lower than 350 nits. In this way, the graphics luminance that essentially needs to be constant varies with time, resulting in an undesired state. In this example, only the influence on the luminance is considered, but in an actual video display apparatus, the influence may also be exerted on color components, and thus colors may also be affected.

[1-8. Solution]

As a means for avoiding the problem described above, a method may be conceived in which the position information of graphics to be overlaid is transmitted to the video display apparatus, and dynamic metadata is not used in an area where the graphics are displayed. However, it is very difficult to implement this method because it is necessary to transmit information that indicates whether graphics are displayed in the entire region of the display screen, and also necessary to make determinations for each display pixel in the processing performed by the video display apparatus.

Also, as described above, when the video reproduction apparatus transmits additional information for causing the video display apparatus to perform the right processing to the video display apparatus, and the video display apparatus performs processing for displaying the HDR video on which graphics have been overlaid, the way the video looks may vary depending on the implementation on the video display apparatus side. This is recognized as a serious problem by content creators. For this reason, in order to constantly perform the right processing, the video reproduction apparatus performs processing according to the specifications in which the operations of the video reproduction apparatus are defined such as Blu-ray specifications so as to process dynamic metadata to be transmitted to the video display apparatus. With this configuration, the video display apparatus can display the video appropriately. However, an image quality degradation may occur depending on the processing on the video display apparatus side, and thus a method including processing on the video display apparatus side is needed.

In the present disclosure, the following solutions are used.

At the time of reproduction of the HDR video, a flag (Graphics_Menu_On_Flag: GMOF) indicating whether a menu is overlaid and displayed is set where necessary when menu graphics are displayed. In the case of a Blu-ray disc, this setting is performed by an HDMV (High Definition Movie Mode) command or a BD-J (Blu-ray Disc Java®) command.

In the case where a disc on which HDR video data or the like is recorded, or HDR data is reproduced, when graphics such as a menu is overlaid and displayed on the HDR video, the video reproduction apparatus sets the GMOF flag to ON. Also, the video reproduction apparatus does not transmit the GMOF flag to the video display apparatus when a tone mapping process or graphics conversion is performed on the video reproduction apparatus side.

When a tone mapping process is performed by the video display apparatus, the video reproduction apparatus transmits a value corresponding to static metadata to the video display apparatus as dynamic metadata. As a result, the video display apparatus fixes the tone mapping, and it is therefore possible to reduce the influence on the graphics.

When the video reproduction apparatus changes the dynamic metadata to a value corresponding to static metadata, or changes the value corresponding to static metadata back to the original dynamic metadata, the video reproduction apparatus gradually changes the value of metadata so as to perform a smooth transition. Accordingly, it is possible to reduce the sense of discomfort in the variation of tone mapping due to the metadata being changed.

In the case where the maximum luminance (MaxLLGM) of menu graphics is designated on the disc or HDR data, the video reproduction apparatus acquires MaxLLGM. Alternatively, the video reproduction apparatus generates a value corresponding to MaxLLGM by analyzing the menu graphics. Also, the video reproduction apparatus receives, from the video display apparatus, the maximum luminance information (MAXTVLL) of the display apparatus. Then, the video reproduction apparatus compares MaxLLGM and MAXTVLL, and determines whether there is an influence of dynamic tone mapping on the menu graphics. If it is determined that there is no influence, the video reproduction apparatus does not perform dynamic metadata conversion processing even when the GMOF flag is set to ON. Accordingly, it is possible to make tone mapping as dynamic as possible on the video display apparatus side, and thus implement better video display.

When GMOF is transmitted to the video display apparatus, the video display apparatus can recognize the fact that graphics are overlaid on the HDR video, and thus perform an appropriate tone mapping process. That is, the video display apparatus switches the processing to, for example, processing of performing tone mapping according to the dynamic metadata, processing of fixing the tone mapping is fixed, processing of performing tone mapping according to the static metadata, or processing of combining the above processing operations according to the luminance level, based on the luminance level of the video display apparatus (for example, a TV set), the luminance level of the content, and the luminance level (MaxLLGM) of the graphics. With this configuration, the video display apparatus can perform appropriate processing.

At this time, the video display apparatus can perform more appropriate processing by using, in the tone mapping process, the maximum luminance (MaxLLGM) of menu graphics designated in the disc or the HDR data, or MaxLLGM generated inside the video reproduction apparatus.

Also, when GMOF is set to ON, the video reproduction apparatus sets a TV-side processing priority flag (TVPAF). When TVPAF is set to ON, the video reproduction apparatus sets the Dynamic Metadata Block Mode Flag (DMBM) to OFF, and transmits DMBM to the video display apparatus. In this case, appropriate processing according to the luminance of the video display apparatus is allowed.

When TVPAF is set to OFF, the video reproduction apparatus sets DMBM to ON, and transmits DMBM to the video display apparatus. In this case, the video display apparatus is forced to perform processing according to the dynamic metadata. That is, the video display apparatus performs processing according to the dynamic metadata processed on the video reproduction apparatus side. Accordingly, processing on the dynamic metadata in the video reproduction apparatus is clearly designated, the video can be displayed in a similar manner by most video display apparatuses.

With the method described above, the influence of dynamic tone mapping on graphics such as menus or subtitles can be reduced when dynamic tone mapping is performed on an HDR video signal transmitted via broadcasting, a packaged medium such as a Blu-ray disc, or internet delivery such as OTT. As a result, it is possible to obtain advantageous effects of stable graphics display and dynamic tone mapping according to the maximum luminance (DPL) of the video display apparatus and the maximum luminance of the moving images.

With the description above, in particular, in the case where the luminance of the video display apparatus is lower than the luminance of a video, HDR effects can be increased, and menus and subtitles can be displayed with high quality as high as that of static tone mapping.

Furthermore, by the video reproduction apparatus transmitting dynamic metadata corresponding to static tone mapping that is not dependent on the processing on the video display apparatus such as a TV set to the video display apparatus, an intention of the content creator can be reproduced more faithfully. On the other hand, if the content creator allows, processing on the video display apparatus side may be selected. Accordingly, by selecting appropriate processing according to the state of graphics, it is possible to suppress the influence on graphics while maximizing the advantageous effects of dynamic tone mapping.

[2-1. Configuration of Video Display System]

Figure 9:
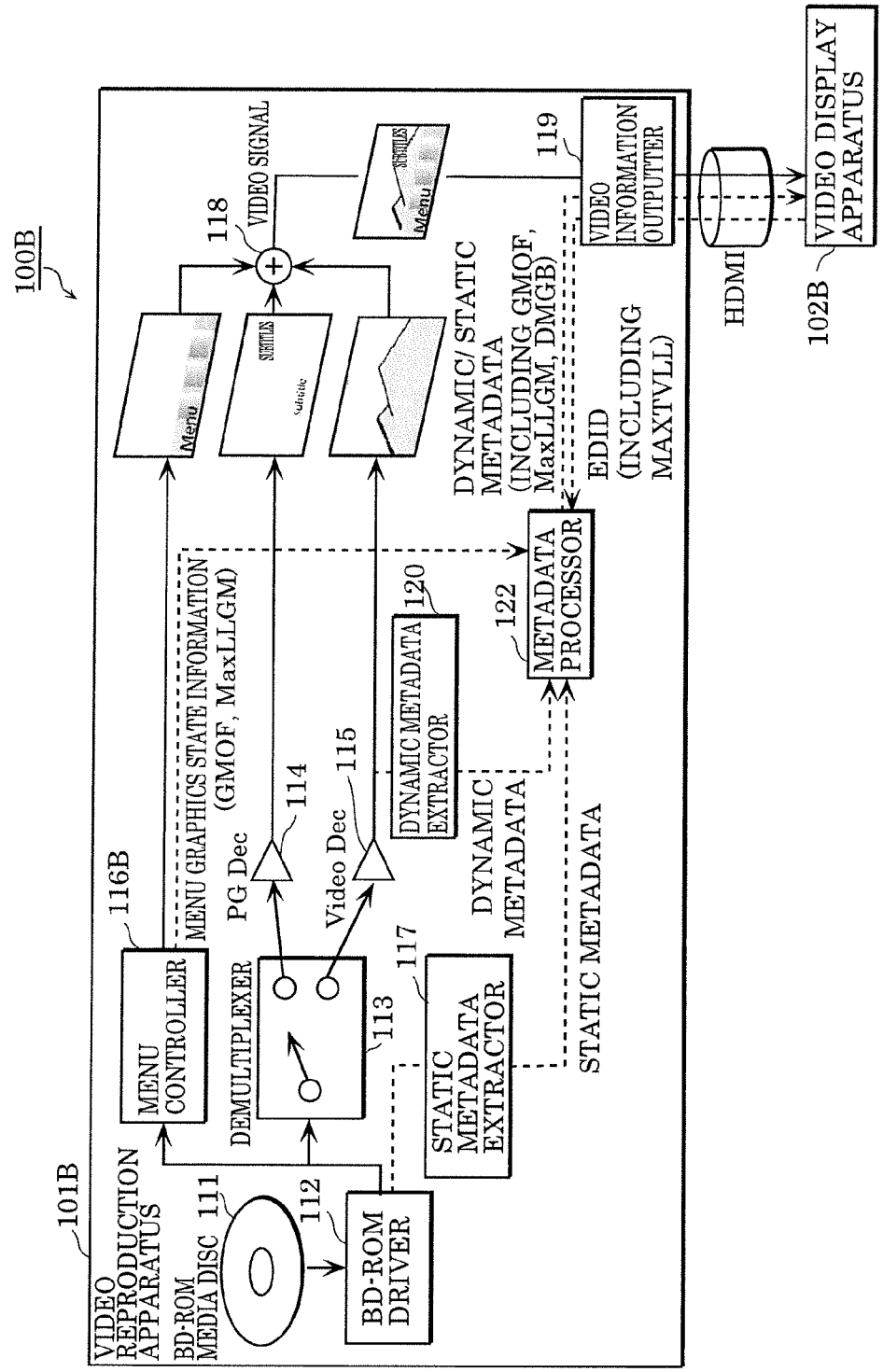
FIG. 9 is a diagram showing a configuration of a video display system according to an embodiment.

FIG. 9 is a diagram showing a configuration of video display system 100B according to the present embodiment. Video display system 100B includes video reproduction apparatus 101B and video display apparatus 102B.

Video reproduction apparatus 101B includes disc 111, BD-ROM driver 112, demultiplexer 113, PG decoder (PG Dec) 114, video decoder (Video Dec) 115, menu controller 116B, static metadata extractor 117, video composer 118, video information outputter 119, dynamic metadata extractor 120, and metadata processor 122.

Disc 111 is a recording medium such as, for example, a BD-ROM media disc, in which a video and other necessary information are recorded. BD-ROM driver 112 reads information from disc 111. Demultiplexer 113 extracts subtitles information, video information, and audio information (not shown) from the information output from BD-ROM driver 112.

PG decoder 114 generates subtitle graphics from the subtitles information extracted by demultiplexer 113. Video decoder 115 generates a video signal from the video information extracted by demultiplexer 113.

Menu controller 116B performs generation of menu graphics and control thereof by using the information output from BD-ROM driver 112. Also, menu controller 116B outputs menu graphics state information (GMOF, TVPAF, and MaxLLGM) to metadata processor 122.

Static metadata extractor 117 extracts static metadata from the information output from BD-ROM driver 112. The static metadata includes information indicating video luminance (for example, maximum luminance and average luminance). The video luminance indicated by the static metadata is video luminance (fixed value) in a predetermined period.

Video composer 118 generates a video signal by overlaying the menu graphics generated by menu controller 116B, the subtitle graphics generated by PG decoder 114, and the video information generated by video decoder 115. That is, video composer 118 overlays the menu graphics and the subtitle graphics on the video information.

Dynamic metadata extractor 120 extracts the dynamic metadata from the video information generated by video decoder 115. The dynamic metadata may be recorded in disc 111 separately, and transmitted to metadata processor 122 in synchronization with the video information. Also, the dynamic metadata includes information that indicates the luminance (for example, maximum luminance and average luminance) of the video. The luminance of the video indicated by the dynamic metadata chronologically varies during a predetermined period. That is, the dynamic metadata indicates the maximum luminance of the video in each of a plurality of time intervals included in the predetermined period of the static metadata.

Metadata processor 122 processes the dynamic metadata extracted by dynamic metadata extractor 120 and the static metadata extracted by static metadata extractor 117 by using the menu graphics state information output from menu controller 116B and the luminance information (MAXTVLL) of video display apparatus 102B, and changes the dynamic metadata according to the state of menu graphics. Also, metadata processor 122 acquires MAXTVLL from, for example, video display apparatus 102B as EDID.

Video information outputter 119 transmits the video signal generated by video composer 118, the audio signal (not shown) extracted by demultiplexer 113, and the dynamic metadata and the static metadata processed by metadata processor 122 to video display apparatus 102B via a transmitter such as HDMI.

Menu controller 116B is implemented by, for example, a BD-J engine that processes a Java command such as BD-J, or an HDMV command interpreter that processes an HDMV command written in the stream as IG.

[2-2. Flag and State]

Hereinafter, each flag and its state will be described in detail. Graphics_Menu_On_Flag (GMOF) is a flag indicating whether menu graphics are overlaid and displayed at the time of reproduction of the HDR video. GMOF is set with a BD-J command or an HDMV command. Even when menu graphics are displayed, GMOF is set to OFF if the menu graphics are not affected by dynamic tone mapping such as when the menu graphics are transparent, when the display region on which the menu graphics are displayed is small, or when the luminance of the menu graphics is sufficiently low.

GMOF=OFF indicates that menu graphics are not overlaid or menu graphics for which the influence of dynamic tone mapping needs not be considered are displayed at the time of reproduction of the HDR video.

GMOF=ON indicates that menu graphics that may be affected by the influence of dynamic tone mapping are overlaid at the time of reproduction of the HDR video. That is, GMOF=ON indicates that the content creator intends to reduce the influence of dynamic tone mapping on the menu graphics by performing some kind of processing in the video reproduction apparatus or the video display apparatus.

Maximum_Luminance_Level_of_Graphics_Menu (MaxLLGM) indicates the maximum luminance of the menu graphics. MaxLLGM is set as a parameter of GMOF. Accordingly, when GMOF is turned off, MaxLLGM is not set.

MaxLLGM=0 indicates that the maximum luminance of the menu graphics is not known, or the menu graphics are transparent.

MaxLLGM=1 to the maximum value indicates the maximum luminance of the menu graphics. The maximum value is arbitrarily defined. For example, in the case where the maximum value is set to 1000 nits, which is the maximum luminance of normally used mastering monitors, when MaxLLGM is set to 8 bits, the maximum luminance of the menu graphics is indicated with an increment of about 4 nits. When MaxLLGM is set to 10 bits, the maximum luminance of the menu graphics is indicated with an increment of about 1 nit.

Maximum_TV_Luminance_Level (MAXTVLL) indicates the maximum luminance at which the video display apparatus can display. Video reproduction apparatus 101B acquires MAXTVLL from, for example, video display apparatus 102B as EDID. Alternatively, the user may set MAXTVLL as the initial settings in video reproduction apparatus 101B.

MAXTVLL may indicate a specific luminance value, or a luminance range to which the maximum luminance of the video display apparatus belongs. That is, any one of the plurality of formats described below can be used for MAXTVLL.

MAXTVLL=0 indicates that the maximum luminance of the video display apparatus is not known. MAXTVLL=1 to the maximum value indicates a specific maximum luminance value of the video reproduction apparatus. In this case, for example, as with MAXLLG, the increment is determined based on the maximum luminance and the bit number. For example, when the maximum value is set to 1000 nits, and display is shown with 8 bits, the maximum luminance of the video reproduction apparatus is indicated by an increment of 4 nits.

Alternatively, MAXTVLL may indicate a luminance range. In this case, for example, MAXTVLL indicates the center value of the luminance range. For example, in the case where the maximum value is 1000 nits, MAXTVLL indicates any one of 1000 nits, 500 nits, and 200 nits. When MAXTVLL is 1000 nits, it indicates that the maximum luminance of the video display apparatus is 700 nits or more. When MAXTVLL is 500 nits, it indicates that the maximum luminance of the video display apparatus is included in a luminance range of 300 nits to 800 nits. When MAXTVLL is 200 nits, it indicates that the maximum luminance of the video display apparatus is 400 nits or less. As described above, the luminance range may or may not be defined in an overlapping manner. Also, MAXTVLL may indicate an index or the like assigned to the luminance range instead of indicating a luminance value such as the center value. For example, with MAXTVLL=1, a luminance range of 400 nits or less is shown. With MAXTVLL=2, a luminance range of 300 to 800 nits is shown, and with MAXTVLL=3, a luminance range of 700 nits or more is shown.

TV Processing Authorized Flag (TVPAF) is a flat indicating whether or not to prioritize the processing of the video display apparatus, and indicates whether the video display apparatus is allowed to process metadata.

TVPAF is set as a parameter of GMOF. Accordingly, when GMOF is set to OFF, TVPAF is not set.

TVPAF=OFF indicates that processing in the video display apparatus is not allowed. That is, this means that dynamic metadata is set to an appropriate value in the video reproduction apparatus.

TVPAF=ON indicates that the processing in the video display apparatus is prioritized. That is, the video reproduction outputs the dynamic metadata and the static metadata recorded in the HDR video without changing the dynamic metadata and the static metadata.

Dynamic Metadata Block Mode Flag (DMBM) indicates whether it is necessary to process the dynamic metadata in the video display apparatus. DMBM is a flag transmitted from the video reproduction apparatus to the video display apparatus together with the metadata.

DMBM=OFF indicates that the dynamic metadata can be changed by the video display apparatus. That is, in this case, when GMOF=ON, the video display apparatus can perform tone mapping using the static metadata instead of the dynamic metadata, or processing according to the characteristics of the video display apparatus by analyzing the HDR video data.

DMBM=ON indicates that the video display apparatus is required to perform processing according to the dynamic metadata transmitted from the video reproduction apparatus.

FIG. 10 is a diagram showing the relationship between combinations of these values and the tone mapping process performed in the video display apparatus.

Mode 0 indicates that no menu graphics overlaid, and dynamic tone mapping is performed according to the dynamic metadata. Mode 1 indicates that menu graphics are overlaid, but the video display apparatus selects appropriate tone mapping. Mode 2 indicates that menu graphics are overlaid, but the video reproduction apparatus determines that there is no influence of dynamic tone mapping on the menu graphics, and the video display apparatus performs dynamic tone mapping according to the dynamic metadata. Mode 3 indicates that the video reproduction apparatus determines that there is an influence of dynamic tone mapping on the menu graphics, and sets dynamic metadata corresponding to static metadata as the dynamic metadata to be transmitted to the video display apparatus so as to fix tone mapping, and static tone mapping is performed.

First, in the case where Java API (application programing interface) or HDMV IG is invoked, in Mode 1, the video display apparatus (for example, a TV set) is allowed to perform additional processing by the studio (content creator), and thus TVPAF=ON (1) is set.

The video reproduction apparatus transmits GMOF=1 (ON), DMBM)=0 (OFF) and MaxLLGM to the video display apparatus via HDMI VSIF (Vendor Specific InfoFrame). In this case, the video display apparatus (TV set) may change the tone mapping curve of the video display apparatus so as to not affect MaxLLGM, and maintain the dynamic metadata mode (dynamic tone mapping).

In Mode 2, the video display apparatus (for example, a TV set) is not allowed to perform additional processing by the studio (content creator), and thus TVPAF=OFF (0) is set. Also, it is determined by the HDR10+ algorithm that MAXTVLL is sufficiently high, or MaxLLGM is sufficiently lower than MAXTVLL. In this case, operations similar to those of Mode 1 are performed.

In Mode 3, TVPAF=OFF (0), and it is determined by the HDR10+ algorithm that MaxLLGM is not sufficiently lower than MAXTVLL.

In this case, the video reproduction apparatus transmits GMOF=1 (ON), DMBM=1 (ON), and MaxLLGM to the video display apparatus via HDMI VSIF. Also, the dynamic metadata in VSIF is set to a fixed static value. Also, the video reproduction apparatus has, as an option, a function of gradually changing the value of metadata.

[2-3. Configuration of Video Display Apparatus]

Figure 11:
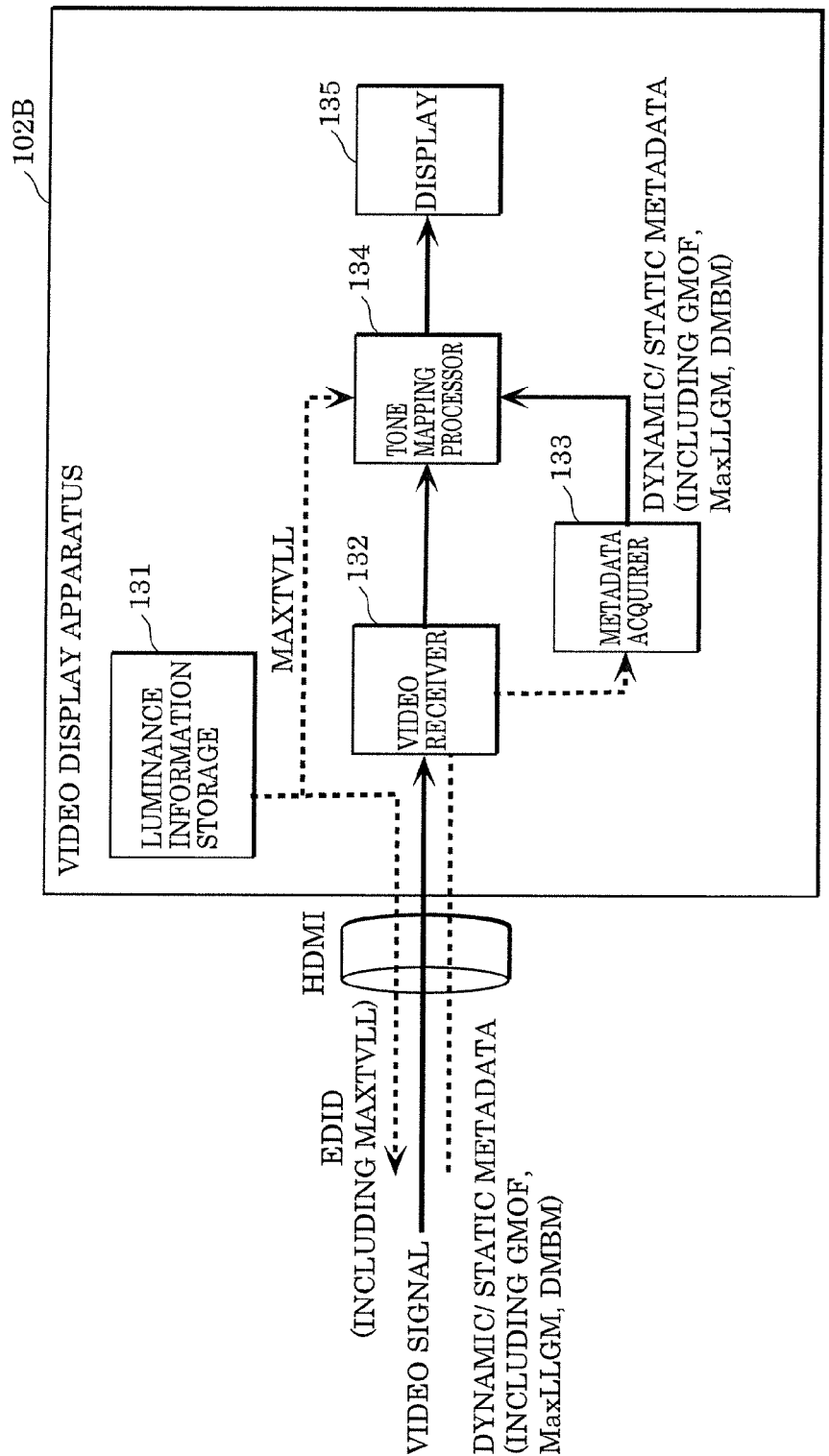
FIG. 11 is a diagram showing a configuration of the video display apparatus according to the embodiment.

FIG. 11 is a block diagram showing a configuration of video display apparatus 102B according to the present embodiment. Video display apparatus 102B includes luminance information storage 131, video receiver 132, metadata acquirer 133, tone mapping processor 134, and display 135.

A video signal, dynamic metadata, and static metadata are input from video reproduction apparatus 101B to video display apparatus 102B via a video information transmitter such as HDMI. Also, video display apparatus 102B transmits information indicating the capabilities of video display apparatus 102B to video reproduction apparatus 101B as EDID.

Luminance information storage 131 stores maximum luminance information (MAXTVLL) for displaying images. Video display apparatus 102B transmits MAXTVLL to video reproduction apparatus 101B via EDID. At this time, video display apparatus 102B simultaneously transmits, to video reproduction apparatus 101B, information indicating that video display apparatus 102B supports specify dynamic metadata and is capable of performing a dynamic tone mapping process.

Video receiver 132 receives the video signal and the metadata. Video receiver 132 transmits the video signal to tone mapping processor 134, and the metadata to metadata acquirer 133. Metadata acquirer 133 acquires various types of parameters of the dynamic metadata including information such as GMOF, MaxLLGM, and DMBM, and various types of parameters of the static metadata, and transmits the acquired parameters to tone mapping processor 134.

Tone mapping processor 134 performs an appropriate tone mapping process on the input video signal by using MAXTVLL, the attribute of display 135, and the metadata transmitted from metadata acquirer 133, and outputs the processed video signal to display 135. Display 135 displays a video based on the processed video signal.

[2-4. Configuration of Metadata Processor]

Figure 12:
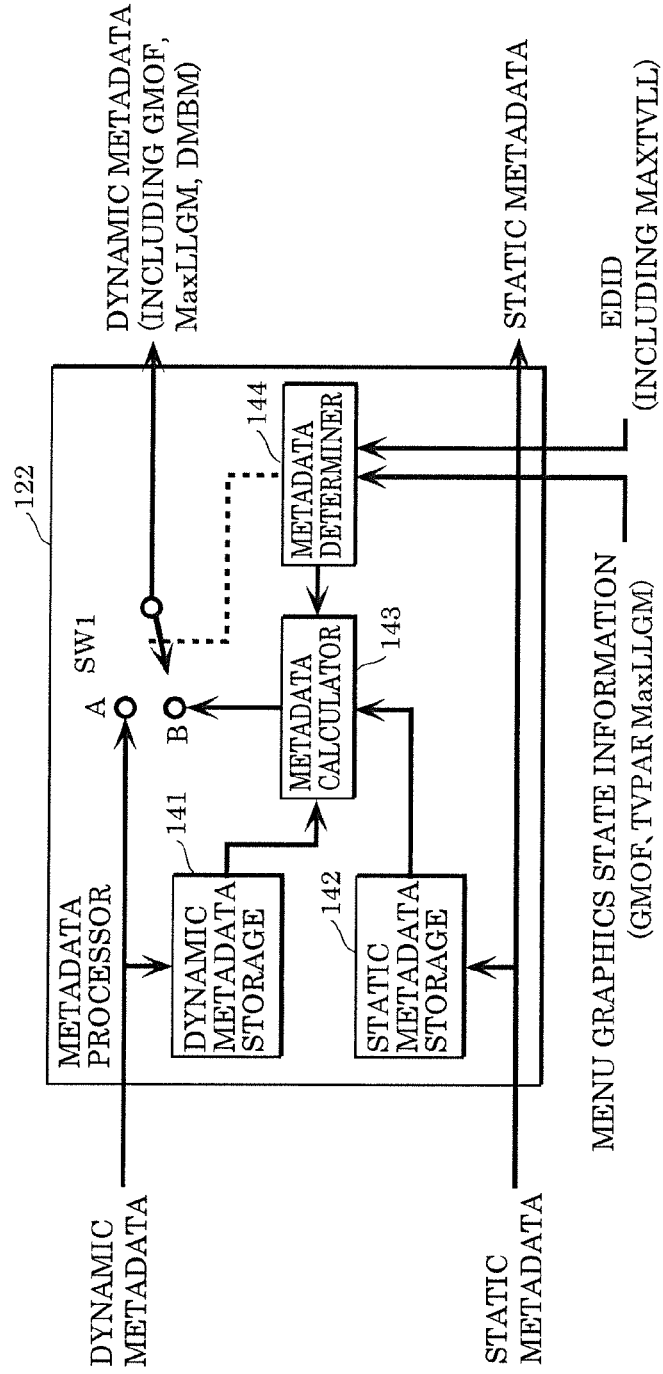
FIG. 12 is a diagram showing a configuration of a metadata processor according to the embodiment.

FIG. 12 is a block diagram showing a configuration of metadata processor 122 included in video reproduction apparatus 101B according to the present embodiment. Metadata processor 122 includes dynamic metadata storage 141, static metadata storage 142, metadata calculator 143, metadata determiner 144, and switch SW1.

Dynamic metadata storage 141 stores the dynamic metadata from dynamic metadata extractor 120 at necessary timing, and also at the same time transmits the same to terminal A of switch SW1.

Static metadata storage 142 stores the static metadata from static metadata extractor 117 at the same timing as dynamic metadata storage 141, and also at the same time transmits the same to video information outputter 119. The static metadata is transmitted to video display apparatus 102B.

Metadata calculator 143 processes the dynamic metadata stored in dynamic metadata storage 141 and the static metadata stored in static metadata storage 142 based on the information from metadata determiner 144, and thereby generates information in a dynamic metadata format, and then transmits the generated dynamic metadata to terminal B of switch SW1.

Metadata determiner 144 receives the menu graphics state information (GMOF, TVPAF, MaxLLGM, and the like) from menu controller 116B and EDID (information regarding the supported video method, MAXTVLL, and the like) from video display apparatus 102B, and controls switch SW1 based on the information so as to select the dynamic metadata from dynamic metadata extractor 120 (select terminal A in switch SW1), or select the dynamic metadata calculated by metadata calculator 143 (select terminal B in switch SW1) as output dynamic metadata. Also, metadata determiner 144 transmits the input menu graphics state information and MAXTVLL to metadata calculator 143. Also, metadata determiner 144 performs control so as to determine whether the metadata is stored in dynamic metadata storage 141 and static metadata storage 142. The dynamic metadata selected and output by switch SW1 is transmitted to video display apparatus 102B via video information outputter 119.

The criteria used by metadata determiner 144 will be described with reference to FIG. 10. In FIG. 10, when the dynamic metadata included in VSIF takes a value of "dynamic value", dynamically changing dynamic metadata is output. Specifically, switch SW1 is connected to terminal A (Case 1). Alternatively, switch SW1 is connected to terminal B. At this time, metadata calculator 143 outputs information obtained by adding values such as GMOF, MaxLLGM, and DMBM to the input dynamic metadata to terminal B, without performing calculation on the input dynamic metadata. As a result, dynamic metadata including GMOF, MaxLLGM, and DMBM is output (Cases 2 to 4, and Case 6).

In the case where the value of the dynamic metadata included in VSIF takes a fixed static value, switch SW1 is connected to terminal B. Also, metadata calculator 143 calculates dynamic metadata indicating a fixed value by using a predetermined calculation method, and adds values such as GMOF, MaxLLGM, and DMBM to the obtained dynamic metadata, and outputs the dynamic metadata to which the values have been added.

In Case 3, MaxLLGM is not set in the recording medium or the HDR data as a JAVA® or HDMV command. In this case, menu controller 116B generates MaxLLGM from the menu graphics displayed.

In Case 6 and Case 7, metadata processor 122 compares MaxLLGM and MAXTVLL. Metadata processor 122 fixes the dynamic metadata (Case 7) when MaxLLGM is a luminance that is sufficiently higher than MAXTVLL (when MAXTVLL is set to Low),

[2-5. Operations]

Figure 13:
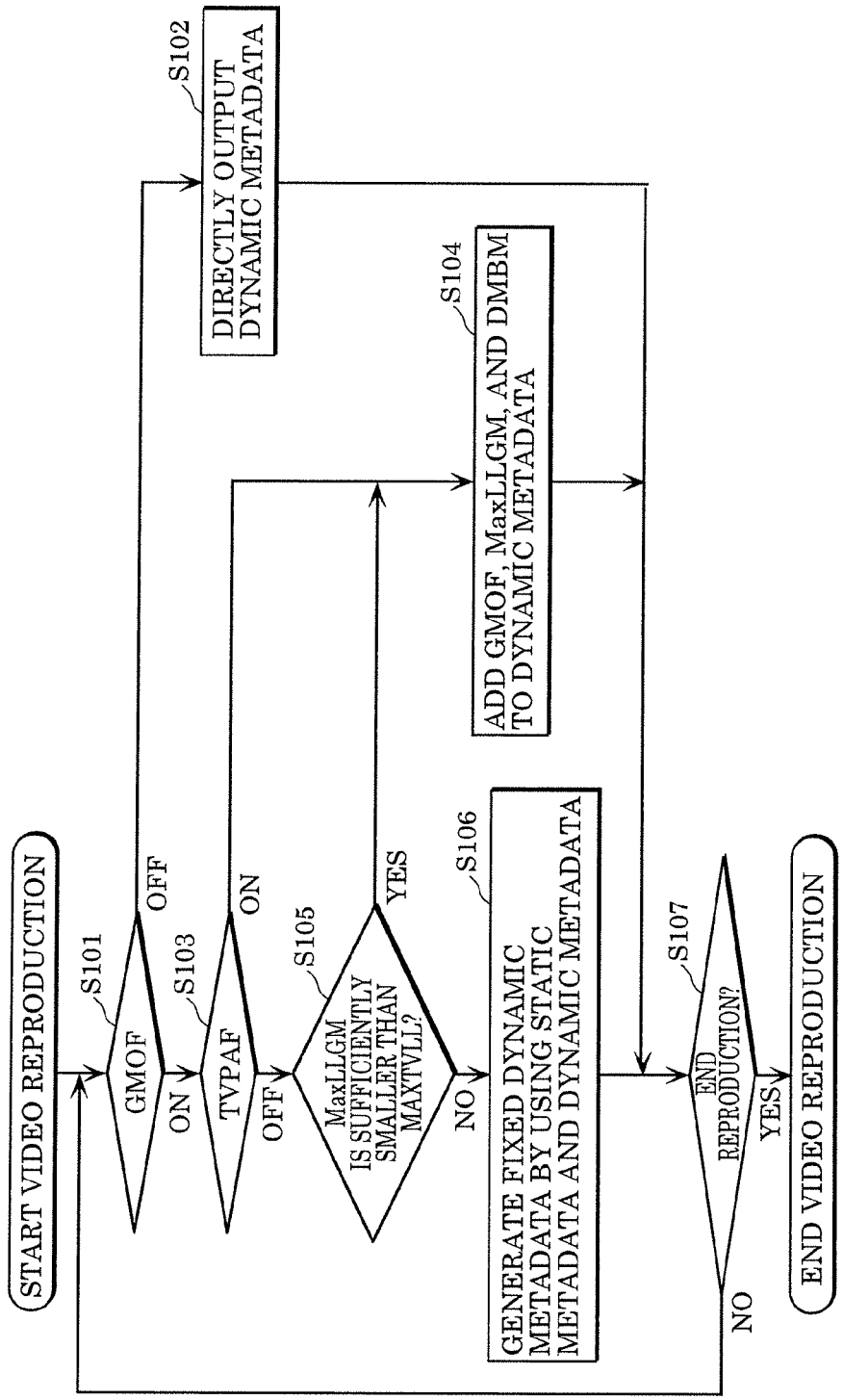
FIG. 13 is a flowchart illustrating the operations of a video reproduction apparatus according to the embodiment.

The operations of video reproduction apparatus 101B will be described first. FIG. 13 is a flowchart illustrating the operations of metadata processor 122 included in video reproduction apparatus 101B according to the present embodiment.

Video reproduction apparatus 101B starts reproduction of an HDR video recorded in disc 111 or the like. GMOF is set to OFF until menu graphics are overlaid and displayed on the video (OFF in S101). Accordingly, switch SW1 is connected to terminal A, and metadata processor 122 outputs the dynamic metadata extracted by dynamic metadata extractor 120 directly to video information outputter 119 (S102). Video information outputter 119 transmits the dynamic metadata to video display apparatus 102B via HDMI or the like. Also, in the case where there is no effective GMOF, operations similar to those performed when GMOF is set to OFF are performed.

When menu graphics are overlaid and displayed on the video, GMOF is set to ON (ON in S101). Accordingly, switch SW1 is connected to terminal B, and metadata processor 122 outputs the dynamic metadata output from metadata calculator 143 to video information outputter 119.

In the case where GMOF is set to ON, and TVPAF is set to ON (ON in S103), dynamic metadata storage 141 outputs the input dynamic metadata directly to metadata calculator 143, without storing the input dynamic metadata. Metadata calculator 143 adds additional metadata (GMOF, MaxLLGM, and DMBM) to the input dynamic metadata, and outputs the dynamic metadata to which the additional metadata has been added (S104). That is, metadata processor 122 substantially directly outputs the dynamic metadata extracted by dynamic metadata extractor 120.

In the case where GMOF is set to ON, and TVPAF is set to OFF or is invalid (OFF in S103), metadata processor 122 determines whether MaxLLGM is sufficiently smaller than MAXTVLL (S105). If it is determined that MaxLLGM is sufficiently smaller than MAXTVLL (YES in S105), as in the case where TVPAF is set to OFF, metadata calculator 143 adds additional metadata (GMOF, MaxLLGM, and DMBM) to the input dynamic metadata, and outputs the dynamic metadata to which the additional metadata has been added (S104). That is, metadata processor 122 substantially directly outputs the dynamic metadata extracted by dynamic metadata extractor 120.

If it is determined that MaxLLGM is not sufficiently smaller than MAXTVLL, or if it is determined that MAXTVLL or MaxLLGM is not present (invalid) (NO in S105), dynamic metadata storage 141 stores the input dynamic metadata, and static metadata storage 142 stores the input static metadata. Metadata calculator 143 generates fixed dynamic metadata by using the stored static metadata and the stored dynamic metadata, adds additional metadata (GMOF, MaxLLGM, and DMBM) to the generated dynamic metadata, and outputs the dynamic metadata to which the additional metadata has been added (S106). By video display apparatus 102B performing processing by using the fixed dynamic metadata, it is possible to obtain advantageous effects similar to those when static metadata is used.

Specifically, for example, metadata calculator 143 keeps outputting the dynamic metadata stored in dynamic metadata storage 141 during a predetermined period, and thereby fixes the dynamic metadata during the period. In this case, static metadata is not used.

Alternatively, metadata calculator 143 composes the stored dynamic metadata and the stored static metadata, and keeps outputting the obtained metadata as dynamic metadata. For example, metadata calculator 143 performs a predetermined calculation (for example, averaging, weighted addition, or the like) on the video maximum luminance indicated by the stored dynamic metadata and the video maximum luminance indicated by the stored static metadata, and keeps outputting dynamic metadata that indicates the obtained maximum luminance.

Alternatively, metadata calculator 143 may calculate a value corresponding to the static metadata as dynamic metadata. That is, metadata calculator 143 may keep outputting dynamic metadata that indicates the maximum luminance indicated by the static metadata stored in static metadata storage 142 for a predetermined period, and thereby fix the dynamic metadata during the period. In this way, metadata calculator 143 generates dynamic metadata that indicates the same video luminance value (fixed value)

during a predetermined period by using at least one of the dynamic metadata stored in dynamic metadata storage 141 and the static metadata stored in static metadata storage 142.

Also, when transitioning the dynamic metadata to the fixed value, metadata calculator 143 may gradually change the value of dynamic metadata that is output from the current value to the fixed value. Alternatively, when changing the value of the dynamic metadata to be output from the fixed value back to the dynamic metadata extracted by dynamic metadata extractor 120, metadata calculator 143 may gradually change the value of the dynamic metadata to be output from the fixed value to the current value. By doing so, it is possible to suppress a rapid change in the tone mapping of video display apparatus 102B.

As used herein, to "gradually change" means that the value is changed continuously or stepwise during a pre-set period. That is, when transitioning the dynamic metadata to the fixed value, the value is changed from the current value to the fixed value via a value of 1 or more between the current value and the fixed value during the above-described period. Also, the term "pre-set period" refers to a period during which, for example, a plurality of frames are displayed.

The condition based on which it is determined that MaxLLGM is sufficiently smaller than MAXTVLL may be, for example, that MaxLLGM is smaller than MAXTVLL by 50%. That is, the condition is that the proportion of MaxLLGM to MAXTVLL (MaxLLGM/MAXTVLL) is smaller than a pre-set proportion (for example, 0.5).

When the proportion is small, it is possible to reduce the influence of dynamic metadata when menu graphics are overlaid on the HDR video, but tone mapping is likely to be fixed, and thus a high-quality HDR video may not be obtained in many cases. Accordingly, by reducing the luminance of menu graphics, the influence of dynamic tone mapping on the menu graphics is reduced such that tone mapping as dynamic as possible is used, it is possible to display a high-quality HDR video. However, the limitation on the creation of menu graphics increases, it is therefore necessary to set the luminance to an appropriate value.

The series of processing operations are repeatedly performed until the reproduction of the video is completed (S107). For example, the processing operations are repeatedly performed for each frame or every plurality of frames.

Next, the operations of video display apparatus 102B will be described. FIG. 14 is a flowchart illustrating the operations of tone mapping processor 134 included in video display apparatus 102B according to the present embodiment.

When the display of the video starts, video receiver 132 receives a video signal and metadata. The video signal and the metadata are separated from each other, and then transmitted separately to tone mapping processor 134.

Tone mapping processor 134 executes tone mapping according to the metadata (S112) (1) when the metadata contains static metadata, but no dynamic metadata, or (2) when dynamic metadata is present and GMOF is set to OFF or GMOF is not present. Then, the tone mapped video signal is transmitted to display 135, and display 135 displays an HDR video based on the video signal.

Specifically, when the metadata contains static metadata, but no dynamic metadata, tone mapping processor 134 performs static tone mapping according to the static metadata, or tone mapping using the result of analysis of the video signal.

Also, when dynamic metadata is present in the metadata, tone mapping processor 134 performs dynamic tone mapping according to the dynamic metadata. In this case as well, tone mapping processor 134 may use the result of analysis of the video signal.

When GMOF is set to ON and DMBM is set to ON or not defined (ON in S111, and ON in S113), tone mapping processor 134 performs dynamic tone mapping according to the dynamic metadata (S114). In this case as well, tone mapping processor 134 may use the result of analysis of the video signal.

When GMOF is set to ON and DMBM is set to OFF (ON in S111, and ON in S113), tone mapping processor 134 compares MaxLLGM and MAXTVLL in the dynamic metadata (S115). If it is determined that MaxLLGM is sufficiently smaller than MAXTVLL (YES in S115), tone mapping processor 134 performs dynamic tone mapping according to the dynamic metadata (S114). The condition based on which it is determined that MaxLLGM is sufficiently smaller than MAXTVLL is, for example, the same as that used in step S105 described above. Also, tone mapping processor 134 may use a parameter other than MAXTVLL.

If it is determined that MaxLLGM is not sufficiently smaller than MAXTVLL, or MaxLLGM has not been transmitted (NO in S115), tone mapping processor 134 performs tone mapping according to the static metadata (S116). If MaxLLGM has been transmitted, tone mapping processor 134 may perform dynamic tone mapping according to the dynamic metadata on a luminance greater than or equal to MaxLLGM, and static tone mapping according to the static metadata on a luminance less than MaxLLGM.

The series of processing operations are repeatedly performed until the display of the video is completed (S117). For example, the processing operations are repeatedly performed for each frame or every plurality of frames.

As described above, tone mapping processor 134 performs a tone mapping process (dynamic tone mapping process) in which, by using dynamic metadata indicating the maximum luminance of the video in each of a plurality of time intervals included in a predetermined period, the luminance of the video in each time interval is converted based on conversion characteristics according to the video maximum luminance in the time interval. Display 135 displays the video that has undergone the tone mapping process. Metadata processor 122 generates first dynamic metadata that indicates the maximum luminance that is constant over the plurality of time intervals by using static metadata that indicates the video maximum luminance during the predetermined period. Video display system 100B switches between: a first operation of (i) generating first dynamic metadata by using the static metadata, performed by metadata processor 122 (S106), and (ii) performing the tone mapping process by using the first dynamic metadata, performed by tone mapping processor 134 (S114); and a second operation of tone mapping processor 134 performing the tone mapping process by using second dynamic metadata in which the maximum luminance varies over the plurality of time intervals (S112).

With this configuration, it is possible to switch between performing dynamic tone mapping and fixing tone mapping without changing the operations of the tone mapping processor. That is, it is possible to implement the function of fixing tone mapping without changing the configuration of the tone mapping processor. Also, the tone mapping processor may be included in the video display apparatus. Accordingly, the above-described function can be implemented simply by making a change to the video reproduction apparatus, without making any changes to the video display apparatus or while reducing the changes. It is also possible to suppress the occurrence of an image quality degradation caused by the processing of the video display apparatus. As described above, with the method according to the present embodiment, it is possible to improve the quality of the video displayed.

Also, video display system 100B further includes video composer 118 that generates the video by overlaying graphics on the main video. When graphics are overlaid on the main video (ON in S101, and ON in S111), the first operation is performed (S106 and S114). When no graphics are overlaid on the main video, the second operation or a third operation is performed, the third operation being an operation in which the tone mapping process is performed by using the static metadata (S112). With this configuration, it is possible to suppress the variation in the luminance of the graphics.

Also, when graphics are overlaid on the main video (ON in S101), and the proportion of the graphics maximum luminance (MaxLLGM) relative to the maximum luminance (MAXTVLL) at which display 135 can display is higher than a pre-set value (NO in S105), the first operation is performed (S106 and S114). When graphics are overlaid on the main video (ON in S101), and the proportion is lower than the pre-set value (YES in S105), the second operation is performed (S104 and S114).

With this configuration, in the case where the possibility of the occurrence of a variation in the graphics luminance is high, the tone mapping is fixed. In the case where the possibility of the occurrence of a variation in the graphics luminance is low, the dynamic tone mapping can be continued. Accordingly, it is possible to appropriately perform dynamic tone mapping while suppressing the variation in the luminance of the graphics.

Also, when graphics are overlaid on the main video (ON in S101), and the proportion is higher than the pre-set value (NO in S105 or No in S115), the first operation (S106 and S114) or the third operation (S116) is performed based on the information (for example, TVPAF) associated with the video.

This configuration allows the content creator to make a setting of allowing or not the tone mapping processor (for example, the video display apparatus) to change the tone mapping process.

Also, metadata processor 122 calculates the maximum luminance that is constant over the plurality of time intervals and is indicated by the first dynamic metadata by calculating the video maximum luminance indicated by the static metadata and the video maximum luminance in a time interval at which the first operation started, which is indicated by the second dynamic metadata. Accordingly, it is possible to create first dynamic metadata that has taken into consideration of the second dynamic metadata and the static metadata.

Also, at the time of switching from the second operation to the first operation, metadata processor 122 changes continuously or stepwise the maximum luminance indicated by the first dynamic metadata from the maximum luminance indicated by the second dynamic metadata to the maximum luminance that is constant over the plurality of time intervals, over a plurality of frames. With this configuration, it is possible to smoothly change the tone mapping at the time of switching the operation.

Also, video display apparatus 102B includes tone mapping processor 134 that performs a tone mapping process of, by using dynamic metadata indicating the maximum luminance of a video in each of a plurality of time intervals included in a predetermined period, converting the luminance of the video in each time interval based on conversion characteristics according to the maximum luminance of the video in the time interval, and display 135 that displays the video that has undergone the tone mapping process. Tone mapping processor 134 switches between the first operation (S114) and the second operation (S112), the first operation being an operation in which a tone mapping process is performed by using first dynamic metadata that is generated by using static metadata indicating the maximum luminance of the video during a predetermined period and indicates the maximum luminance that is constant over the plurality of time intervals, and the second operation being an operation in which a tone mapping process is performed by using second dynamic metadata in which the maximum luminance varies over the plurality of time intervals.

With this configuration, it is possible to switch between performing dynamic tone mapping and fixing tone mapping without changing the operations of the tone mapping processor. That is, it is possible to implement the function of fixing tone mapping without changing the configuration of the tone mapping processor. Also, it is possible to possible to suppress the occurrence of an image quality degradation caused by the processing of the video display apparatus. As described above, with the method according to the present embodiment, it is possible to improve the quality of the video displayed.

Also, tone mapping processor 134 performs the first operation when the video contains graphics (ON in S111) (S114), and performs the second operation or a third operation of performing the tone mapping process by using the static metadata (S112) when the video contains no graphics (OFF in S111).

Also, when the video contains graphics (ON in S111), and tone mapping processor 134 is forced to perform the first tone mapping process (ON in S113) by a flag (DMBM) that forces tone mapping processor 134 to perform the first tone mapping process using dynamic metadata among the first tone mapping process and the second tone mapping process using static metadata, tone mapping processor 134 performs the first tone mapping process. When tone mapping processor 134 is not forced to perform the first tone mapping process by the flag (DMBM) (OFF in S113), tone mapping processor 134 performs the first tone mapping process (S114) or the second tone mapping process (S116). When the first operation is performed (S106 and S114), tone mapping processor 134 is forced to perform the first tone mapping process by the flag (DMBM).

With this configuration, it is possible to cause the video reproduction apparatus to forcibly perform processing using the first dynamic metadata, and thus tone mapping fixing processing can be reliably implemented by using the first dynamic metadata.

Also, when the video contains graphics and tone mapping processor 134 is not forced to perform the first tone mapping process by the flag (DMBM) (ON in S111 and OFF in S113), and when the proportion of the graphics maximum luminance (MaxLLGM) relative to the maximum luminance (MAXTVLL) at which display 135 can display is higher than a pre-set value (NO in S115), tone mapping processor 134 performs the second tone mapping process (S116). When the proportion is lower than the pre-set value (YES in S115), tone mapping processor 134 performs the first tone mapping process (S114).

With this configuration, in the case where the possibility of the occurrence of a variation in the graphics luminance is high, the tone mapping is fixed. In the case where the possibility of the occurrence of a variation in the graphics luminance is low, the dynamic tone mapping can be continued. Accordingly, it is possible to appropriately perform dynamic tone mapping while suppressing the variation in the luminance of the graphics.

[3. Variation]

The HDR video reproduced by the video reproduction apparatus may be a video included in, for example, a Blu-ray disc, a DVD, a moving image delivery site on the Internet, broadcast, or a HDD (Hard Disk Drive).

The video reproduction apparatus described above may be an apparatus that decodes a compressed video signal transmitted from a recording medium, a broadcast, or the Internet, and transmits the decoded video signal to a video display apparatus. Examples of the video reproduction apparatus include a disc player, a disc recorder, a set top box, a television set, a personal computer, and a smartphone. Also, video display apparatus 102B may have some or all of the functions of video reproduction apparatus 101B. For example, among the processors included in video reproduction apparatus 101B, video display apparatus 102B may include the processors other than disc 111 and BD-ROM driver 112. Also, video receiver 132, metadata acquirer 133, and tone mapping processor 134 included in video display apparatus 102B may be incorporated in video reproduction apparatus 101B. Also, video reproduction apparatus 101B may have some of the functions of tone mapping processor 134.

The video signal transmitting means that transmits the video signal from the video reproduction apparatus to the video display apparatus may be a means that transmits the video signal in an uncompressed state such as HDMI, DVI, or DP, or may be a means that transmits the video signal in a compressed form such as transmission via a network.

The maximum luminance information or the tone mapping information of the video display apparatus can be set in the video reproduction apparatus by a user inputting the information into the video reproduction apparatus via a remote controller or the like, or via an operating apparatus included in the video reproduction apparatus. Alternatively, the user may acquire these information via the Internet or any other means, store the acquired information in a portable storage medium, and transmit the information to the video reproduction apparatus via the portable storage medium. Alternatively, the video reproduction apparatus may be connected directly to the Internet such that the video reproduction apparatus can acquire these information from a database on a server. Furthermore, the video reproduction apparatus may display a test pattern on the video display apparatus such that these information can be acquired or stored, with the user confirming the characteristics of the video display apparatus by using the displayed test pattern.

The video reproduction apparatus may generate graphics luminance information (MaxLLGM) by detecting the luminance of graphics (subtitles or a menu) from the data, or acquire the luminance of graphics created in advance during production of the video data. For example, the graphics luminance may be recorded in a disc, or may be transmitted as metadata via broadcasting or the Internet. The video reproduction apparatus reads the graphics luminance, and transmits the read graphics luminance to the video display apparatus as a portion of the dynamic metadata. Alternatively, the luminance information of graphics (subtitles or a menu) may be recorded in a database on a server that is connected to the Internet as information regarding the content to be reproduced such that the video reproduction apparatus can acquire the graphics luminance information (MaxLLGM) from the database, and transmit the acquired graphics luminance information to the video display apparatus.

The proportion (for example, 50%) used to compare MaxLLGM and MAXTVLL may be determined according to the feature of the video signal based on which the video is to be displayed, and be stored in a disc. Alternatively, the proportion may be determined according to the feature of the video display apparatus. Alternatively, the proportion may be acquired from a database on the Internet.

Up to here, the video display system according to the embodiment of the present disclosure has been described, but the present disclosure is not limited to the embodiment.

Also, the processors included in the video display system according to the embodiment described above are typically implemented as LSIs, which are integrated circuits. They may be individual single chips, or a part or all of them may be configured in a single chip.

Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Also, in the embodiment described above, the structural elements may be configured using dedicated hardware, or may be implemented by executing a software program suitable for the structural elements. The structural elements may be implemented by a program executor such as a CPU or a processor reading and executing a software program recorded in a recording medium such as a hard disk or a semiconductor memory.

Also, the present disclosure may be implemented as a method executed by the video display system.

Also, the functional blocks shown in the block diagrams are merely examples. Accordingly, it is possible to implement a plurality of functional blocks as a single functional block, or divide a single functional block into a plurality of blocks. Alternatively, some functions may be transferred to other functional blocks. Also, the functions of a plurality of functional blocks that have similar functions may be processed by a single piece of hardware or software in parallel or by time division.

Also, the order in which the steps of each flowchart are performed is merely an example provided to specifically describe the present disclosure. Accordingly, the order is not limited to that described above. Also, one or more of the steps described above may be performed simultaneously with (in parallel to) other steps.

A video display system according to one or more aspects has been described by way of embodiments above, but the present disclosure is not limited to the embodiments given above. Embodiments obtained by making various modifications that can be conceived by a person having ordinary skill in the art to the above embodiments as well as embodiments implemented by any combination of the structural elements of different embodiments without departing from the gist of the present disclosure may also be encompassed within the scope of one or more aspects.

INDUSTRIAL APPLICABILITY

The present disclosure is applicable to a video display system, a video reproduction apparatus, or a video display apparatus.

REFERENCE MARKS IN THE DRAWINGS 100, 100A, 100B video display system
101, 101A, 101B video reproduction apparatus
102, 102A, 102B video display apparatus
111 disc
112 BD-ROM driver
113 demultiplexer
114 PG decoder
115 video decoder
116, 116B menu controller
117 static metadata extractor
118 video composer
119 video information outputter
120 dynamic metadata extractor
121 metadata switch
122 metadata processor
131 luminance information storage
132 video receiver
133 metadata acquirer
134 tone mapping processor
135 display
141 dynamic metadata storage
142 static metadata storage
143 metadata calculator
144 metadata determiner

The invention claimed is:

1. A video display system, comprising:
a tone mapping processor that performs a tone mapping process of, by using dynamic metadata indicating a maximum luminance of a video in each of a plurality of time intervals included in a predetermined period, converting a luminance of the video in each time interval based on conversion characteristics according to the maximum luminance of the video in the time interval;
a display that displays the video that has undergone the tone mapping process;
a metadata processor that generates first dynamic metadata that indicates the maximum luminance that is constant over the plurality of time intervals by using static metadata that indicates a maximum luminance of the video in the predetermined period, and
a composer that generates the video by overlaying graphics on a main video, wherein:
the video display system switches between: a first operation of (i) generating the first dynamic metadata by using the static metadata, performed by the metadata processor, and (ii) performing the tone mapping process by using the first dynamic metadata, performed by the tone mapping processor; and a second operation of performing the tone mapping process by using second dynamic metadata in which the maximum luminance varies over the plurality of time intervals, performed by the tone mapping processor,
when the graphics are overlaid on the main video, and a proportion of a maximum luminance of the graphics relative to a maximum luminance at which the display can display is higher than a pre-set value, the first operation is performed, and
when the graphics are not overlaid on the main video, the second operation or a third operation of performing the tone mapping process by using the static metadata is performed, and
when the graphics are overlaid on the main video, and the proportion is lower than the pre-set value, the second operation is performed.

2. The video display system according to claim 1, wherein, when the graphics are overlaid on the main video, and the proportion is higher than the pre-set value, the first operation or the third operation is performed based on information associated with the video.

3. The video display system according to claim 1, wherein the metadata processor calculates the maximum luminance that is constant over the plurality of time intervals and is indicated by the first dynamic metadata by calculating the maximum luminance of the video indicated by the static metadata and a maximum luminance of the video in a time interval at which the first operation started, which is indicated by the second dynamic metadata.

4. The video display system according to claim 1, wherein, at a time of switching from the second operation to the first operation, the metadata processor changes continuously or stepwise the maximum luminance indicated by the first dynamic metadata from the maximum luminance indicated by the second dynamic metadata to the maximum luminance that is constant over the plurality of time intervals, over a plurality of frames.

5. A video display method in a video display system, the video display method comprising:
performing a tone mapping process of, by using dynamic metadata indicating a maximum luminance of a video in each of a plurality of time intervals included in a predetermined period, converting a luminance of the video in each time interval based on conversion characteristics according to the maximum luminance of the video in the time interval;
displaying the video that has undergone the tone mapping process step;
generating first dynamic metadata that indicates the maximum luminance that is constant over the plurality of time intervals by using static metadata that indicates a maximum luminance of the video in the predetermined period; and
generating the video by overlaying graphics on a main video, wherein:
switching is performed between: a first operation of (i) generating the first dynamic metadata by using the static metadata, and (ii) performing the tone mapping process by using the first dynamic metadata; and a second operation of performing the tone mapping process by using second dynamic metadata in which the maximum luminance varies over the plurality of time intervals,
when the graphics are overlaid on the main video, and a proportion of a maximum luminance of the graphics relative to a maximum luminance at which the display can display is higher than a pre-set value, the first operation is performed, and
when the graphics are not overlaid on the main video, the second operation or a third operation of performing the tone mapping process by using the static metadata is performed, and
when the graphics are overlaid on the main video, and the proportion is lower than the pre-set value, the second operation is performed.

6. The video display method according to claim 5, wherein, when the graphics are overlaid on the main video, and the proportion is higher than the pre-set value, the first operation or the third operation is performed based on information associated with the video.

7. The video display method according to claim 5,
wherein the maximum luminance that is constant over the plurality of time intervals and is indicated by the first dynamic metadata is calculated by calculating the maximum luminance of the video indicated by the static metadata and a maximum luminance of the video in a time interval at which the first operation started, which is indicated by the second dynamic metadata.

8. The video display method according to claim 5,
wherein, at a time of switching from the second operation to the first operation, the maximum luminance indicated by the first dynamic metadata is changed continuously or stepwise from the maximum luminance indicated by the second dynamic metadata to the maximum luminance that is constant over the plurality of time intervals, over a plurality of frames.

* * * * *